US012450720B2

(12) United States Patent
Engel et al.

(10) Patent No.: US 12,450,720 B2
(45) Date of Patent: *Oct. 21, 2025

(54) SYSTEMS AND METHODS FOR AUTOMATED INSPECTION OF VEHICLES FOR BODY DAMAGE

(71) Applicant: UVeye Ltd., Tel Aviv (IL)

(72) Inventors: Guy Engel, Herzliya (IL); Paz Ilan, Tel Aviv (IL); Noa Yedidia, Givatayim (IL); Tomer Efi Daloomi, Tel Aviv (IL); Daniel Arzouan, Ramat Gan (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/991,874

(22) Filed: Dec. 23, 2024

(65) Prior Publication Data
US 2025/0299319 A1  Sep. 25, 2025

Related U.S. Application Data

(63) Continuation-in-part of application No. 18/613,176, filed on Mar. 22, 2024, now Pat. No. 12,175,651.

(51) Int. Cl.
*G06T 7/00* (2017.01)
*G06T 7/20* (2017.01)
(Continued)

(52) U.S. Cl.
CPC .............. *G06T 7/0008* (2013.01); *G06T 7/20* (2013.01); *G06T 7/30* (2017.01); *G06T 7/70* (2017.01);
(Continued)

(58) Field of Classification Search
USPC ................................................. 382/141, 103
See application file for complete search history.

(56) References Cited

U.S. PATENT DOCUMENTS 7,222,027 B2 * 5/2007 Gorinevsky ....... G05B 23/0221
702/34
7,428,345 B2 * 9/2008 Caspi .................. H04N 5/2625
348/E5.054
(Continued)

FOREIGN PATENT DOCUMENTS

CN  108564579  9/2018
CN  116205903  6/2023

OTHER PUBLICATIONS

Notice of Allowance Dated Sep. 5, 2024 together with Interview Summary Dated Aug. 23, 2024 From the US Patent and Trademark Office U.S. Appl. No. 18/613,176. (7 Pages).
(Continued)

*Primary Examiner* — Ishrat I Sherali

(57) ABSTRACT

There is provided a method of image processing for detection of damage on a vehicle, comprising: accessing time-spaced image sequences depicting a region of a vehicle, captured by image sensors positioned at different heights and/or angles relative to the vehicle, identifying candidate regions of damage in the time-spaced image sequences, performing multi-level redundancy validation by: executing spatial correlation between images captured by different images sensors at different heights and/or different angles, executing temporal correlation between consecutive images captured by each image sensor, and validating persistence of each candidate region of damage across a threshold number of consecutive frames, identifying redundancy in the candidate regions of damage corresponding to a common physical location of the vehicle denoting a single physical damage region based on the multi-level redundancy validation, and providing an indication of the common physical location of the vehicle corresponding to the single physical damage region.

17 Claims, 9 Drawing Sheets

(51) Int. Cl.
*G06T 7/30* (2017.01)
*G06T 7/70* (2017.01)
*G06V 10/74* (2022.01)

(52) U.S. Cl.
CPC .. *G06V 10/761* (2022.01); *G06T 2207/30108* (2013.01)

(56) References Cited

U.S. PATENT DOCUMENTS

| | | | | |
|---|---|---|---|---|
| 10,469,725 | B2* | 11/2019 | Prasad | H04N 23/60 |
| 11,010,838 | B2* | 5/2021 | Xu | G06N 3/045 |
| 11,301,981 | B2* | 4/2022 | Hever | G06T 7/37 |
| 12,175,651 | B1* | 12/2024 | Engel | G06T 7/001 |
| 12,203,872 | B2* | 1/2025 | Holzer | G06F 3/012 |
| 12,272,162 | B2* | 4/2025 | Penny | G06T 3/18 |
| 2006/0265146 | A1 | 11/2006 | Gorinevsky et al. | |
| 2020/0082545 | A1 | 3/2020 | Wylie et al. | |
| 2021/0081698 | A1 | 3/2021 | Lindeman et al. | |
| 2021/0090242 | A1 | 3/2021 | Hever et al. | |
| 2021/0312702 | A1 | 10/2021 | Holzer et al. | |
| 2022/0172346 | A1 | 6/2022 | Chen et al. | |
| 2022/0358757 | A1* | 11/2022 | Liu | G06V 10/764 |

OTHER PUBLICATIONS

Official Action Dated Jun. 21, 2024 From the US Patent and Trademark Office U.S. Appl. No. 18/613,176. (13 Pages).
Supplementary European Search Report and the European Search Opinion Dated Aug. 11, 2025 From the European Patent Office Re. Application No. 25163298.0. (12 Pages).
Barari et al. "Duplicate Instance Identification in Multiview and Multiscale Systems", 2020 IEEE Sixth International Conference on Multimedia Big Data (BIGMM), pp. 37-44, XP033843811, Sep. 24, 2020.
Yu et al. "Background-Foreground Segmentation Based on Dominant Motion Estimation and Static Segmentation", Image and Signal Processing and Analysis, IWISPA 2000. Proceedings of the First International Workshop on Jun. 14-15, pp. 69-74, XP010538126, Jun. 14, 2000.

* cited by examiner

SYSTEMS AND METHODS FOR AUTOMATED INSPECTION OF VEHICLES FOR BODY DAMAGE

RELATED APPLICATION

This application is a Continuation-in-Part (CIP) of U.S. patent application Ser. No. 18/613,176 filed on Mar. 22, 2024, the contents of which are incorporated herein by reference in their entirety.

FIELD AND BACKGROUND

The present invention, in some embodiments thereof, relates to image processing and, more specifically, but not exclusively, to systems and methods for analyzing images for detecting damage to a vehicle.

Vehicles may be automatically inspected by a system, to detect damage, and defects, for example scratches and/or dents.

SUMMARY

According to a first aspect, a computer implemented method of image processing for detection of damage on a vehicle, comprises: accessing a plurality of time-spaced image sequences depicting a region of a vehicle, captured by a plurality of image sensors positioned at a plurality of different views, identifying a plurality of candidate regions of damage in the plurality of time-spaced image sequences, performing a spatiotemporal correlation between the plurality of time-spaced image sequences, identifying redundancy in the plurality of candidate regions of damage corresponding to a common physical location of the vehicle denoting a single physical damage region, and providing an indication of the common physical location of the vehicle corresponding to the single physical damage region.

According to a second aspect, a system for image processing for detection of damage on a vehicle, comprises: at least one processor executing a code for: accessing a plurality of time-spaced image sequences depicting a region of a vehicle, captured by a plurality of image sensors positioned at a plurality of different views, identifying a plurality of candidate regions of damage in the plurality of time-spaced image sequences, performing a spatiotemporal correlation between the plurality of time-spaced image sequences, identifying redundancy in the plurality of candidate regions of damage corresponding to a common physical location of the vehicle denoting a single physical damage region, and providing an indication of the common physical location of the vehicle corresponding to the single physical damage region.

According to a third aspect, a non-transitory medium storing program instructions for image processing for detection of damage on a vehicle, which when executed by at least one processor, cause the at least one processor to: access a plurality of time-spaced image sequences depicting a region of a vehicle, captured by a plurality of image sensors positioned at a plurality of different views, identify a plurality of candidate regions of damage in the plurality of time-spaced image sequences, perform a spatiotemporal correlation between the plurality of time-spaced image sequences, identify redundancy in the plurality of candidate regions of damage corresponding to a common physical location of the vehicle denoting a single physical damage region, and provide an indication of the common physical location of the vehicle corresponding to the single physical damage region.

In a further implementation form of the first, second, and third aspects, the vehicle is moving relative to the plurality of image sensors, and the spatiotemporal correlation includes correlating between different images of different image sensors captured at different points in time.

In a further implementation form of the first, second, and third aspects, the identifying redundancy is performed for identifying a plurality of single physical damage regions within a common physical component of the vehicle.

In a further implementation form of the first, second, and third aspects, further comprising: analyzing the plurality of single physical damage regions within the common physical component of the vehicle, and generating a recommendation for fixing the common physical component.

In a further implementation form of the first, second, and third aspects, further comprising: classifying each of the plurality of single physical damage regions into a damage category, wherein analyzing comprises analyzing at least one of a pattern of distribution of the plurality of single physical damage regions and a combination of damage categories of the plurality of single physical damage regions.

In a further implementation form of the first, second, and third aspects, further comprising: iterating the identifying redundancy for identifying a plurality of single physical damage regions within a plurality of physical components of the vehicle, and generating a map of the plurality of physical components of the vehicle marked with respective location of each of the plurality of single physical damage regions.

In a further implementation form of the first, second, and third aspects, performing the spatiotemporal correlation comprises: computing a transformation between a first image captured by a first image sensor set at a first view and a second image captured by a second image sensor set at a second view different than the first view, wherein the first image depicts a first candidate region of damage, wherein the second image depicts a second candidate region of damage, applying the transformation to the first image to generate a transformed first image depicting a transformed first candidate region of damage, computing a correlation between the second candidate region of damage and the transformed first candidate region of damage, and wherein identifying redundancy comprises identifying redundancy of the first candidate region of damage and the second candidate region of damage when the correlation is above a threshold.

In a further implementation form of the first, second, and third aspects, the threshold indicates an amount of overlap of the second candidate region of damage and the transformed first candidate region of damage, at the common physical location.

In a further implementation form of the first, second, and third aspects, further comprising: detecting a plurality of features in the first image and in the second image, matching the plurality of features detected in the first image to the plurality of features detected in the second images, and wherein computing the transformation comprises computing the transformation according to the matched plurality of features.

In a further implementation form of the first, second, and third aspects, further comprising: segmenting the common physical location from the plurality of time-spaced image sequences, wherein the spatiotemporal correlation is performed for the segmented common physical locations of the plurality of time-spaced image sequences.

In a further implementation form of the first, second, and third aspects, further comprising: classifying each of the plurality of time-spaced images into a classification category indicating a physical component of the vehicle of a plurality of physical components, clustering the plurality of time-spaced images into a plurality of cluster of time-spaced images each corresponding to one of the plurality of physical components, wherein the spatiotemporal correlation and identifying redundancy are implemented for each cluster for providing the single physical damage region for each physical component of each cluster.

In a further implementation form of the first, second, and third aspects, performing the spatiotemporal correlation comprises performing the spatiotemporal correlation between: time-spaced images of a sequence of a same image sensor captured at different times, between time-spaced images sequences of different image sensors at different views overlapping at the common physical location of the vehicle captured at a same time, and between time-spaced images sequences of different image sensors overlapping at the common physical location of the vehicle captured at different times.

In a further implementation form of the first, second, and third aspects, performing a spatiotemporal correlation comprising: computing a predicted candidate region of damage comprising a location of where a first candidate region of damage depicted in a first image is to predicted to be located in a second image according to a time difference between capture of the first image and the second image, wherein the second image depicts a second candidate region of damage, computing a correlation between the predicted candidate region of damage and the second candidate region of damage, and wherein identifying redundancy comprises identifying redundancy of the first candidate region of damage and the second candidate region of damage when the correlation is above a threshold.

In a further implementation form of the first, second, and third aspects, the predicted candidate region of damage is computed according to a relative movement between the vehicle and at least one image sensor capturing the first image and second image, the relative movement occurring by at least one of the vehicle moving relative to the at least one image sensor and the at least one image sensor moving relative to the vehicle.

In a further implementation form of the first, second, and third aspects, the first image and the second image are captured by a same image sensor.

In a further implementation form of the first, second, and third aspects, further comprising creating a plurality of filtered time-spaced images by removing background from the plurality of time-spaced image sequences, wherein the background that is selected for removal doesn't move according to a predicted motion between the vehicle and the plurality of image sensors, wherein the identifying, the performing the spatiotemporal correlation, and the identifying redundancy are performed on the filtered time-spaced images.

In a further implementation form of the first, second, and third aspects, further comprising: selecting a baseline region of damage in one of the plurality of time-spaced images corresponding to the physical location of the vehicle, and ignoring candidate regions of damage in other time-spaced images that correlate to the same physical location of the vehicle as the baseline region of damage.

In a further implementation form of the first, second, and third aspects, further comprising: labelling as an actual region of damage the candidate regions of damage in other time-spaced images that do not correlate to the same physical location of the vehicle as the base line region of damage and are located in another physical location of the vehicle.

In a further implementation form of the first, second, and third aspects, further comprising: presenting, within a user interface, an image of the vehicle with at least one indication of damage, each corresponding to the single physical damage area at the common physical location of the vehicle, wherein the image of the vehicle is segmented into a plurality of components, receiving, via the user interface, a selection of a component of the plurality of components, and in response to the selection of the component, presenting, within the user interface, an indication of at least one detected region of damage to the selected component.

In a further implementation form of the first, second, and third aspects, each detected region of damage is depicted by at least one of: within a boundary and a distinct visual overlay over the damage.

In a further implementation form of the first, second, and third aspects, a single boundary may include a plurality of detected regions of damage corresponding to a single aggregated damage region.

In a further implementation form of the first, second, and third aspects, further comprising: in response to a selection of one of the detected regions of damage, via the user interface, presenting within the user interface, at least one parameter of the selected detected region of damage.

In a further implementation form of the first, second, and third aspects, the at least one parameter is selected from: type of damage, recommendation for fixing the damage, indication of whether component is to be replaced or not, physical location of the damage on the component, estimated cost for repair.

In a further implementation form of the first, second, and third aspects, further comprising: in response to a selection of one of the detected regions of damage, via the user interface, presenting via the user interface, an interactive selection element for selection by a user of at least one of: severity of the damage, and rejection or acceptance of the damage.

In a further implementation form of the first, second, and third aspects, further comprising: in response to a selection of one of the detected regions of damage, via the user interface, presenting via the user interface, an enlarged image of the selected region of damage, and automatically focusing on the damage within the selected region of damage.

In a further implementation form of the first, second, and third aspects, the plurality of components represent separate physically distinct components of the vehicle each of which is individually replaceable.

In a further implementation form of the first, second, and third aspects, further comprising: mapping the vehicle to one predefined 3D model of a plurality of predefined 3D models, wherein the plurality of components are defined on the 3D model, mapping the at least one detected region of damage to the plurality of components on the 3D model, and presenting, within the user interface, the 3D model with the at least one detected region depicted thereon.

According to a fourth aspect, a computer implemented method of image processing for detection of damage on a vehicle, comprises: accessing a plurality of time-spaced image sequences depicting a region of a vehicle, captured by a plurality of image sensors positioned at a plurality of different heights and/or angles relative to the vehicle, identifying a plurality of candidate regions of damage in the plurality of time-spaced image sequences, performing multi-level redundancy validation by: executing spatial correlation between images captured by different images sensors at different heights and/or different angles, executing temporal correlation between consecutive images captured by each image sensor, and validating persistence of each candidate region of damage across a threshold number of consecutive frames, identifying redundancy in the plurality of candidate regions of damage corresponding to a common physical location of the vehicle denoting a single physical damage region based on the multi-level redundancy validation, and providing an indication of the common physical location of the vehicle corresponding to the single physical damage region.

According to a fifth aspect, a system for image processing for detection of damage on a vehicle, comprises: at least one processor executing a code for: accessing a plurality of time-spaced image sequences depicting a region of a vehicle, captured by a plurality of image sensors positioned at a plurality of different heights and/or angles relative to the vehicle, identifying a plurality of candidate regions of damage in the plurality of time-spaced image sequences, performing multi-level redundancy validation by: executing spatial correlation between images captured by different images sensors at different heights and/or different angles, executing temporal correlation between consecutive images captured by each image sensor, and validating persistence of each candidate region of damage across a threshold number of consecutive frames, identifying redundancy in the plurality of candidate regions of damage corresponding to a common physical location of the vehicle denoting a single physical damage region based on the multi-level redundancy validation, and providing an indication of the common physical location of the vehicle corresponding to the single physical damage region.

According to a sixth aspect, non-transitory medium storing program instructions for image processing for detection of damage on a vehicle, which when executed by at least one processor, cause the at least one processor to: access a plurality of time-spaced image sequences depicting a region of a vehicle, captured by a plurality of image sensors positioned at a plurality of different heights and/or angles relative to the vehicle, identify a plurality of candidate regions of damage in the plurality of time-spaced image sequences, perform multi-level redundancy validation by: executing spatial correlation between images captured by different images sensors at different heights and/or different angles, executing temporal correlation between consecutive images captured by each image sensor, and validating persistence of each candidate region of damage across a threshold number of consecutive frames, identify redundancy in the plurality of candidate regions of damage corresponding to a common physical location of the vehicle denoting a single physical damage region based on the multi-level redundancy validation, and provide an indication of the common physical location of the vehicle corresponding to the single physical damage region.

In a further implementation form of the fourth, fifth, and sixth aspects, validating persistence of each candidate region of damage across a threshold number of consecutive frames comprises: tracking each respective candidate region of damage across a plurality of consecutive frames for identifying a number of frames of the plurality of consecutive frames for which each respective candidate region is detected, and designating the respective candidate region of damage as an actual region of damage when the number of frames in which the respective candidate region of damage appears is greater than the threshold number of consecutive frames.

In a further implementation form of the fourth, fifth, and sixth aspects, further comprising designating the respective candidate region of damage as transient visual artifacts when the number of frames in which the respective candidate region of damage appears is less than the threshold number of consecutive frames.

In a further implementation form of the fourth, fifth, and sixth aspects, further comprising: computing a confidence score for each candidate region of the plurality of candidate regions of damage, wherein the confidence score is computed according to at least one of: overlap, angle consistency, and damage characteristics, selecting a subset of the plurality of candidate regions of damage having confidence scores above a confidence threshold, and performing the multi-level redundancy validation for the subset of the plurality of candidate regions of damage.

In a further implementation form of the fourth, fifth, and sixth aspects, the confidence score is computed for a first candidate region of damage depicted in a first image according to overlap with at least one second candidate region of damage depicted in at least one second image registered to the first image.

In a further implementation form of the fourth, fifth, and sixth aspects, registration between the first image and the at least one second image is computed by mapping the first image and the at least one second image to a common coordinate system, wherein the overlap between the first candidate region of damage and the at least one second candidate region of damage is computed according to the common coordinate system.

In a further implementation form of the fourth, fifth, and sixth aspects, overlap comprises at least one of: similarity between size of the first candidate region and the at least one second candidate region, ratio of the first candidate region and the at least one second candidate region, and a distance between a center of the first candidate region and the at least one second candidate region.

In a further implementation form of the fourth, fifth, and sixth aspects, the confidence score takes into account partial visibility of the candidate region and/or errors in transformation between a first candidate region of damage depicted in a first image and at least one second candidate region of damage depicted in at least one second image.

In a further implementation form of the fourth, fifth, and sixth aspects, the angle consistency is computed by: computing a first pose of an image sensor that captured a first image depicting the respective candidate region of damage, computing a second pose of the image sensor that captured a second image depicting the respective candidate region of damage, and computing a similarity between the first pose and the second pose.

In a further implementation form of the fourth, fifth, and sixth aspects, the confidence score is based on damage characteristics indicating likelihood of actual damage versus artifacts for the respective candidate region of damage computed by analyzing at least one image depicting the respective candidate region of damage.

In a further implementation form of the fourth, fifth, and sixth aspects, executing spatial correlation comprises: analyzing each image of the images captured by different images sensors and depicting candidate regions of damage to identify at least one predefined marker, matching the at least one predefined marker detected in a first image captured by a first image sensor depicting a first candidate region of damage, to the at least one predefined marker detected in a second image captured by a second image sensor depicting a second candidate region of damage, wherein the matching is done in two dimensions, according to the two dimensional location of the candidate region of damage and intrinsic information of the different image sensors, computing a three dimensional mapping between a first pose of the first sensor and a second pose of the second sensor, and identifying redundancy by validating that the first candidate region of damage captured by the first image sensor is the same as the second candidate region of damage captured by the second image second according to the 3D mapping.

In a further implementation form of the fourth, fifth, and sixth aspects, the at least one predefined marker is selected from: a door, a window, a bumper, and a wheel.

In a further implementation form of the fourth, fifth, and sixth aspects, further comprising: analyzing each image of the images captured by different images sensors and depicting candidate regions of damage to identify lightening conditions, and dynamically adjusting an overlap threshold indicating amount of overlap between a first image captured by a first image sensor depicting a first candidate region of damage, and a second image captured by a second image sensor depicting a second candidate region of damage, wherein the overlap threshold is dynamically adjusted for accounting for shadow and/or reflection inconsistencies for reducing probability of misidentifying redundant damage regions.

In a further implementation form of the fourth, fifth, and sixth aspects, identifying redundancy comprises: analyzing each image depicting a candidate region of damage to identify a 3-point correlation comprising: time associated with the image, a pose of an image sensor capturing the image, and alignment of the image, and designating the image depicting the candidate region of damage as unique when the 3-point correlation associated with the image is non-correlated with another 3-point correlation of another image depicting the candidate region of damage.

In a further implementation form of the fourth, fifth, and sixth aspects, further comprising designating the image depicting the candidate region of damage as redundant when the 3-point correlation associated with the image is correlated with another 3-point correlation of another image depicting the candidate region of damage.

In a further implementation form of the first, second, and third aspects, further comprising: receiving via the user interface, instructions for rotating, displacement, and/or zoom in/out of the 3D model, and presenting the 3D model with implementation of the instructions.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
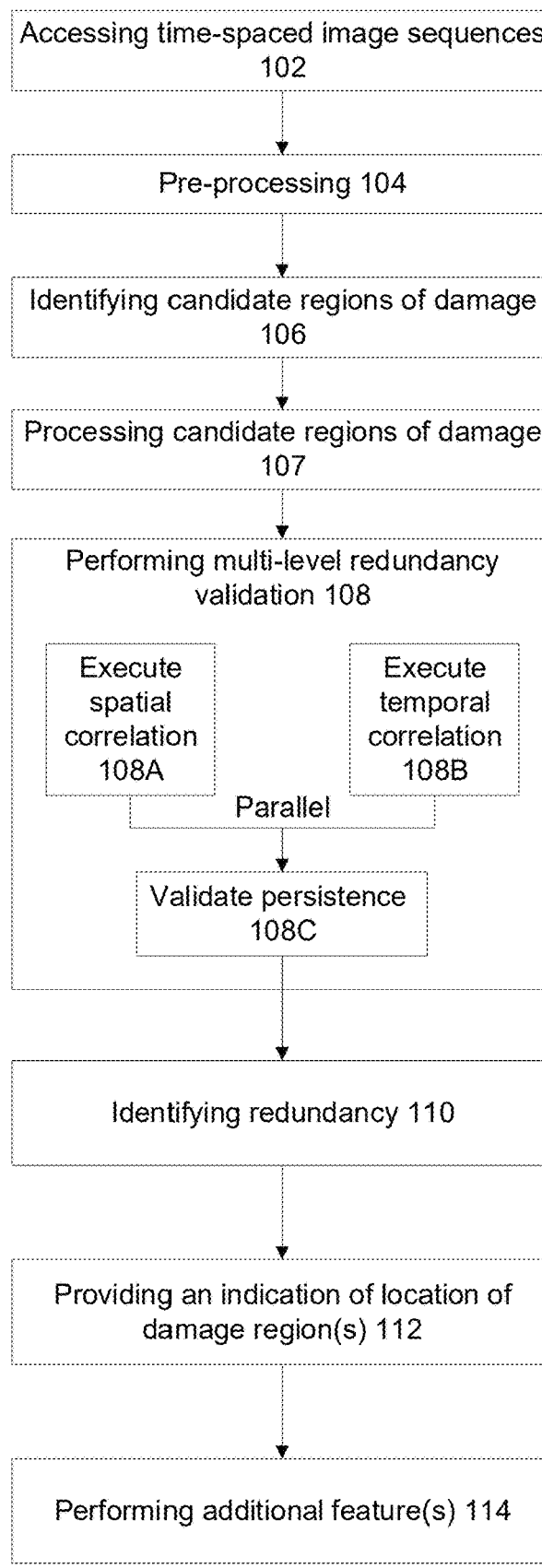
FIG. 1 is a flowchart of a method of image processing for detection of damage on a vehicle by identifying redundancy of candidate regions in images, in accordance with some embodiments of the present invention.

The present invention, in some embodiments thereof, relates to image processing and, more specifically, but not exclusively, to systems and methods for analyzing images for detecting damage to a vehicle.

As used herein, the term vehicle may refer to a car, for example, sedan, sports car, minivan, SUV, and the like. However, it is to be understood that embodiments described herein may be used to detect damage in other vehicles, for example, buses, hulls of boats, and aircraft.

An aspect of some embodiments of the present invention relates to systems, methods, computing devices, and/or code instructions (e.g., stored on a data storage device and executable by one or more processors) for processing of multiple images for detection of damage to (e.g., on) a vehicle, optionally for damage to a body of the vehicle such as the doors, hood, roof, bumper, and head/rear lights, for example, scratches and/or dents. Multiple time-spaced image sequences depicting a region of a vehicle are accessed. The multiple time-spaced image sequences are captured by multiple image sensors (e.g., cameras) positioned at multiple different heights and/or angles (i.e., views) relative to the vehicle. Each image sensor may capture a sequence of images captured at different times, for example, frames captured at a defined frame rate. Multiple candidate regions of damage are identified in the time-spaced image sequences, for example, by feeding the images into a detector machine learning model trained to detect damage. It is undetermined whether the multiple candidate regions of damage represent different physical regions of damage, or correspond to the same physical region of damage. A multi-level redundancy validation is performed as follows. A spatial correlation is executed between images captured by different image sensors at different heights and/or different angles. A temporal correlation is executed between consecutive images captured by each image sensor. Persistence of each candidate region of damage across a threshold number of consecutive frames is validated. The temporal correlation is executed between images (e.g., frames) captured by a same image sensor at different times. The spatial correlation is executed between images (e.g., frames) captured by different image sensors each set at a different height and/or angle. Redundancy is identified based on the multi-level redundancy validation, for the candidate regions of damage corresponding to a common physical location of the vehicle denoting a single physical damage region.

An aspect of some embodiments of the present invention relates to systems, methods, computing devices, and/or code instructions (e.g., stored on a data storage device and executable by one or more processors) for processing of multiple images for detection of damage on a vehicle, optionally for damage to a body of the vehicle such as the doors, hood, roof, bumper, and head/rear lights, for example, scratches and/or dents. Multiple time-spaced image sequences depicting a region of a vehicle are accessed. The multiple time-spaced image sequences are captured by multiple image sensors (e.g., cameras) positioned at multiple different views. Each image sensor may capture a sequence of images captured at different times, for example, frames captured at a defined frame rate. Multiple candidate regions of damage are identified in the time-spaced image sequences, for example, by feeding the images into a detector machine learning model trained to detect damage. It is undetermined whether the multiple candidate regions of damage represent different physical regions of damage, or correspond to the same physical region of damage. A spatiotemporal correlation is performed between the time-spaced image sequences. The spatiotemporal correlation includes a time correlation and a spatial correlation, which may be computed using different processing pipelines, optionally in parallel. The time correlation is performed between images (e.g., frames) captured by a same image sensor at different times. The spatial correlation is performed between images (e.g., frames) captured by different image sensors each set at a different view. Redundancy is identified for the candidate regions of damage corresponding to a common physical location of the vehicle denoting a single physical damage region.

Examples of redundancy identification include: for two overlapping images captured by two different cameras at two different views, each image depicting a respective candidate region of damage, redundancy may be identified indicating that the candidate regions of damage in the images captured by the two image sensors represent the same physical damage region. In another example, for two images captured by the same camera at different times (e.g., 1 second apart, 3 seconds apart, or other values), each image depicting a respective candidate region of damage, redundancy may be identified indicating that the candidate regions of damage in the images captured at different times represent the same physical damage region. For each of the aforementioned examples, the identified redundancy indicates there is a single physical damage region, rather than multiple damaged regions.

An indication of the common physical location of the vehicle corresponding to the single physical damage region is provided, for example, presented on a display, optionally within a user interface such as a graphical user interface (GUI). The GUI may be designed to enable the user to interact with the image depicting the physical damage reason, for example, to obtain more information in response to selection of the damage on an image.

At least some embodiments described herein address the technical problem of identifying damage to a vehicle, optionally to the body of the vehicle, for example, dents and/or scratches. Images of the vehicle are captured by multiple cameras arranged at different heights and/or angles (also referred to herein as views) relative to the vehicle, for capturing images depicting different surfaces of the body of the vehicle. The vehicle may be moving with respect to the cameras, for creating time-spaced image sequences where a same camera held still captures images depicting different parts of the vehicle. Using an automated process for detecting damages, the same damage region may appear in different images of the same camera and/or in different images of different cameras. For example, what may appear as several damage may actually just be a small scratch or dent. At least some embodiments described herein improve the technical field of image processing, by eliminating redundant instances of a same damage to a body of a vehicle, for generating a set of actual physical damage to the vehicle.

At least some embodiments described herein provide a solution to the aforementioned technical problem, and/or improve upon the aforementioned technical field, by performing multi-level redundancy validation. The multi-level redundancy validation may include one or more of the following: executing spatial correlation between images captured by different images sensors at different heights and/or different angles, executing temporal correlation between consecutive images captured by each image sensor, and validating persistence of each candidate region of damage across a threshold number of consecutive frames.

At least some embodiments described herein provide a solution to the aforementioned technical problem, and/or improve upon the aforementioned technical field, by performing a spatiotemporal correlation between multiple time-spaced image sequences captured by multiple image sensors positioned at multiple different views. Multiple candidate regions of damage are identified for multiple images of the sequences. It is undetermined whether the multiple candidate regions of damage represent different physical regions of damage, or correspond to the same physical region of damage. The spatiotemporal correlation includes a time correlation and a spatial correlation which may be computed using different processing pipelines, optionally in parallel. The time correlation is performed between images (e.g., frames) captured by a same image sensor at different times. The spatial correlation is performed between images (e.g., frames) captured by different image sensors each set at a different view. Redundancy is identified for the candidate regions of damage corresponding to a common physical location of the vehicle denoting a single physical damage region. An indication of the common physical location of the vehicle corresponding to the single physical damage region is provided.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
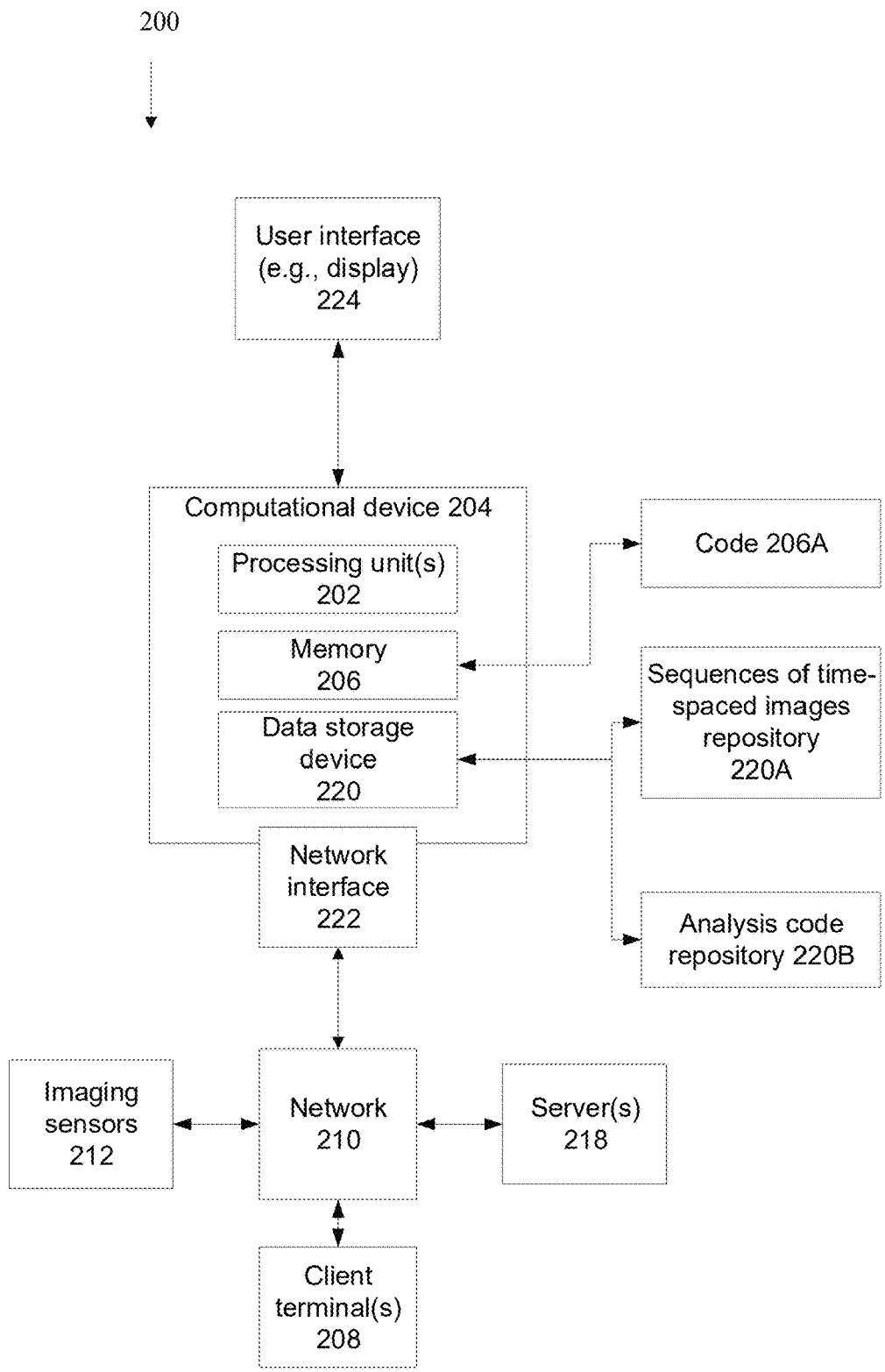
FIG. 2 is a block diagram of components of a system 200 for image processing for detection of damage on a vehicle by identifying redundancy of candidate regions in images, in accordance with some embodiments of the present invention.
Figure 3:
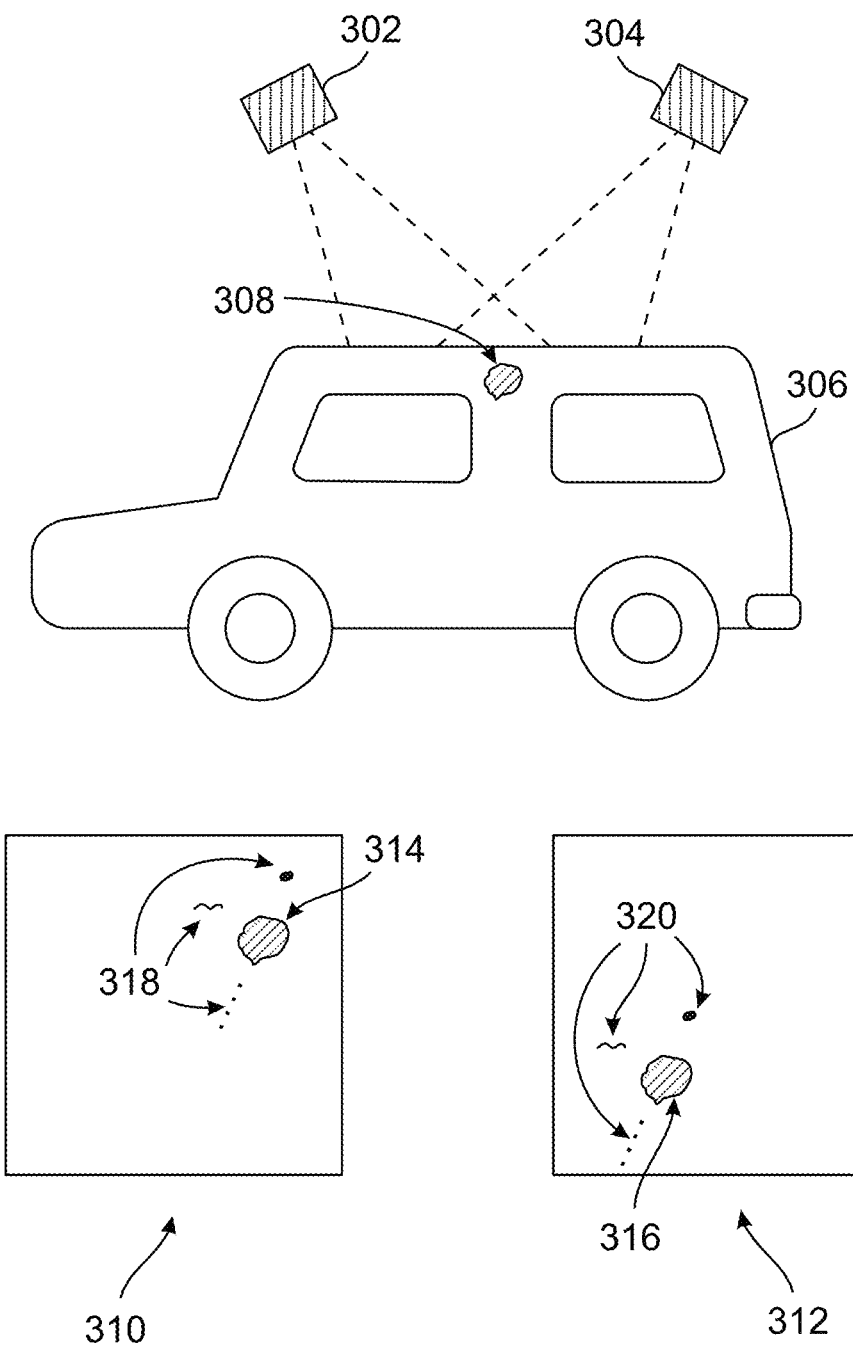
FIG. 3 is a schematic depicting spatial correlation of images of a vehicle, in accordance with some embodiments of the present invention.
Figure 4:
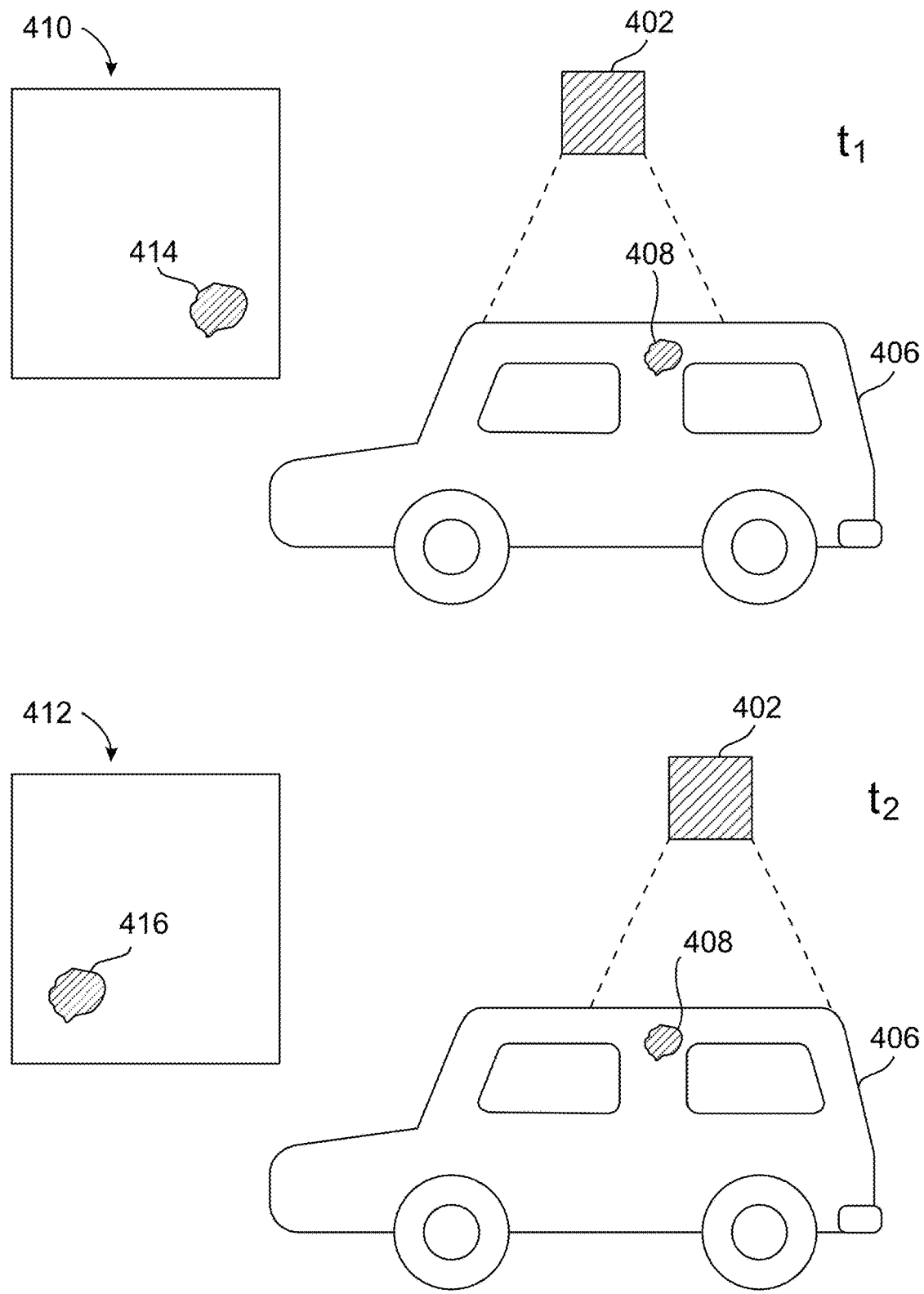
FIG. 4 is a schematic depicting temporal correlation of images of a vehicle, in accordance with some embodiments of the present invention.
Figure 5:
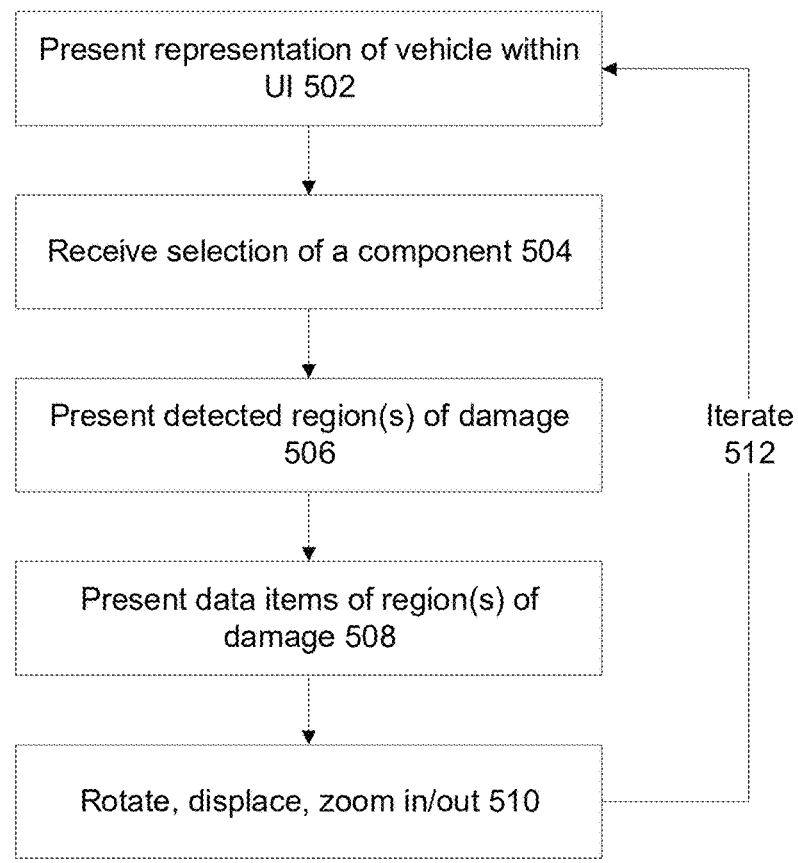
FIG. 5 is a flowchart of a method of operating a user interface, optionally an interactive GUI, presenting identified physical damage regions on a vehicle, in accordance with some embodiments of the present invention.
Figure 6:
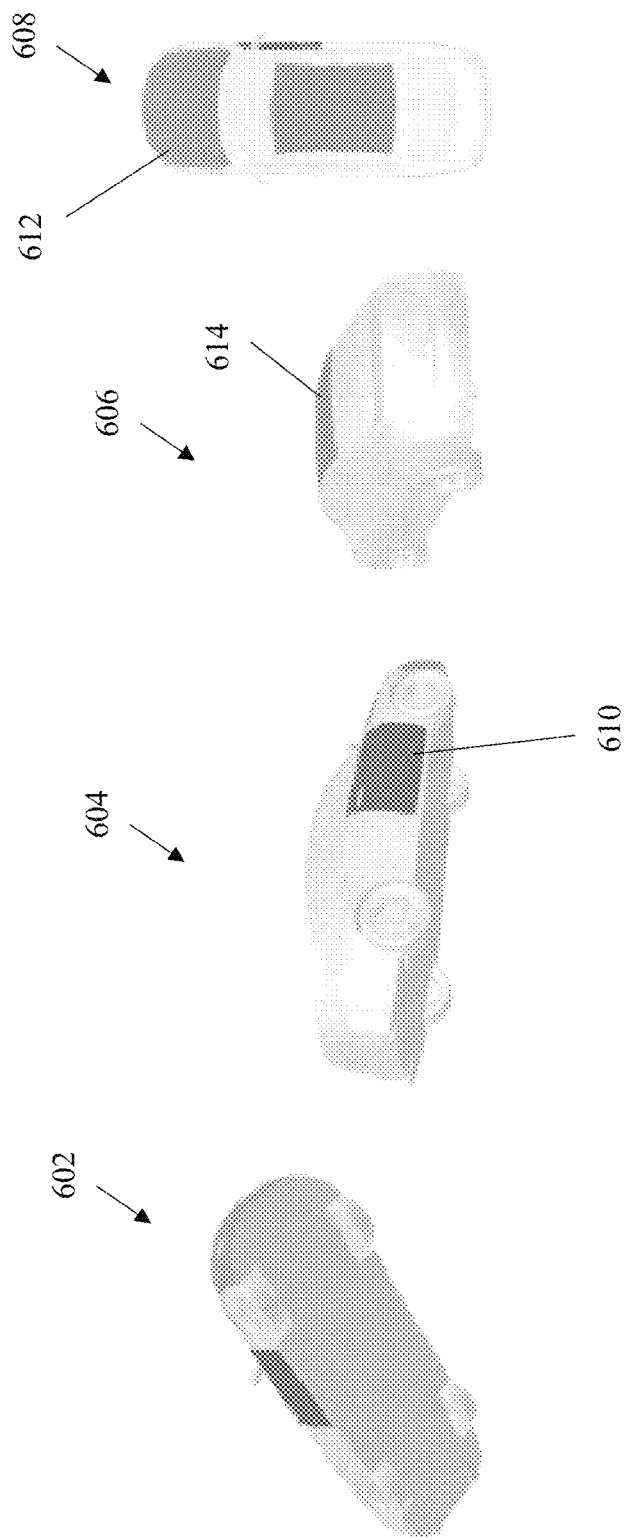
FIG. 6 is a schematic of exemplary views of a 3D model of a vehicle presented within a UI, in accordance with some embodiments of the present invention.
Figure 7:
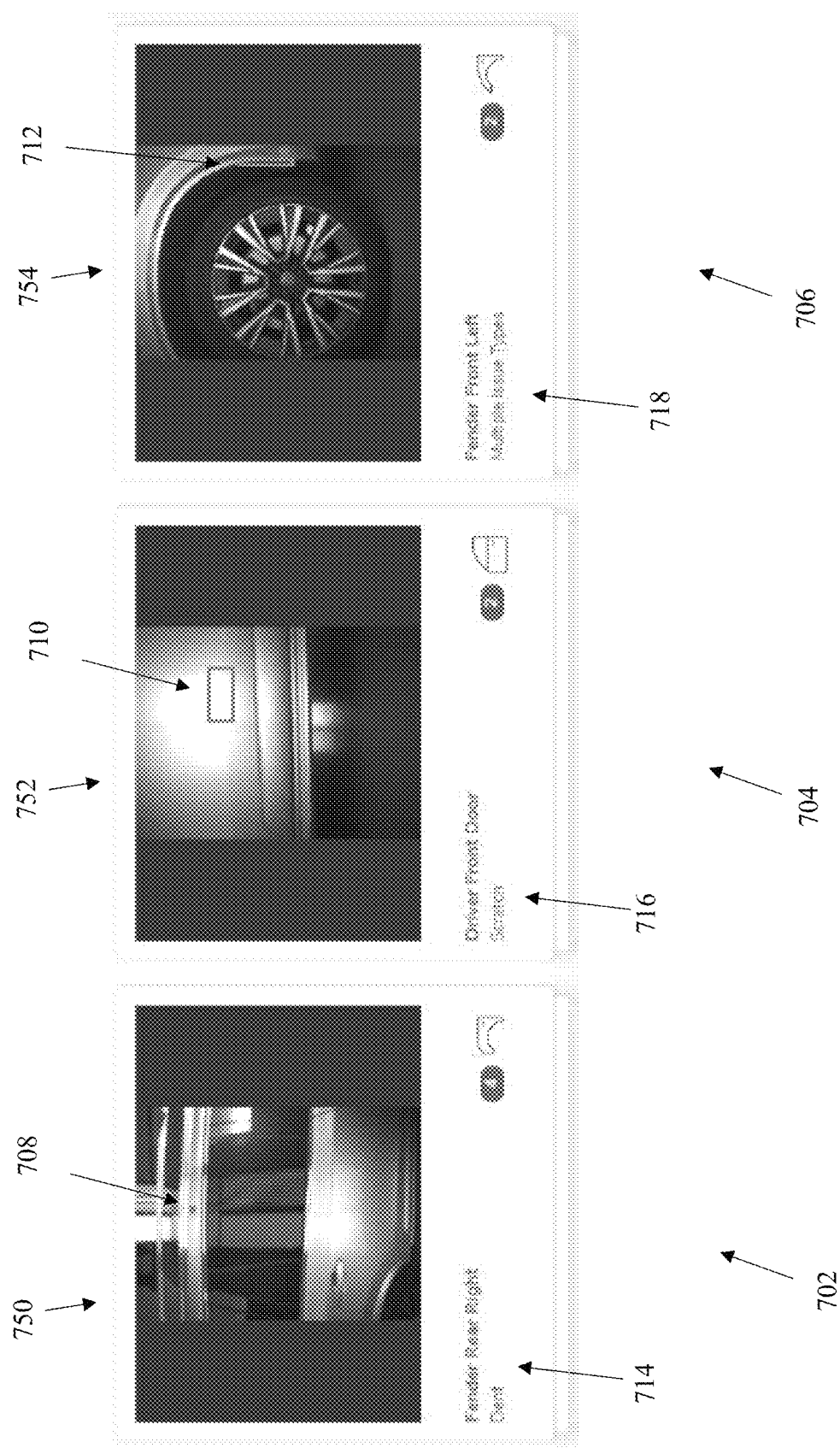
FIG. 7 includes exemplary images of regions of a vehicle with marked detected regions of damage, in accordance with some embodiments of the present invention.
Figure 8:
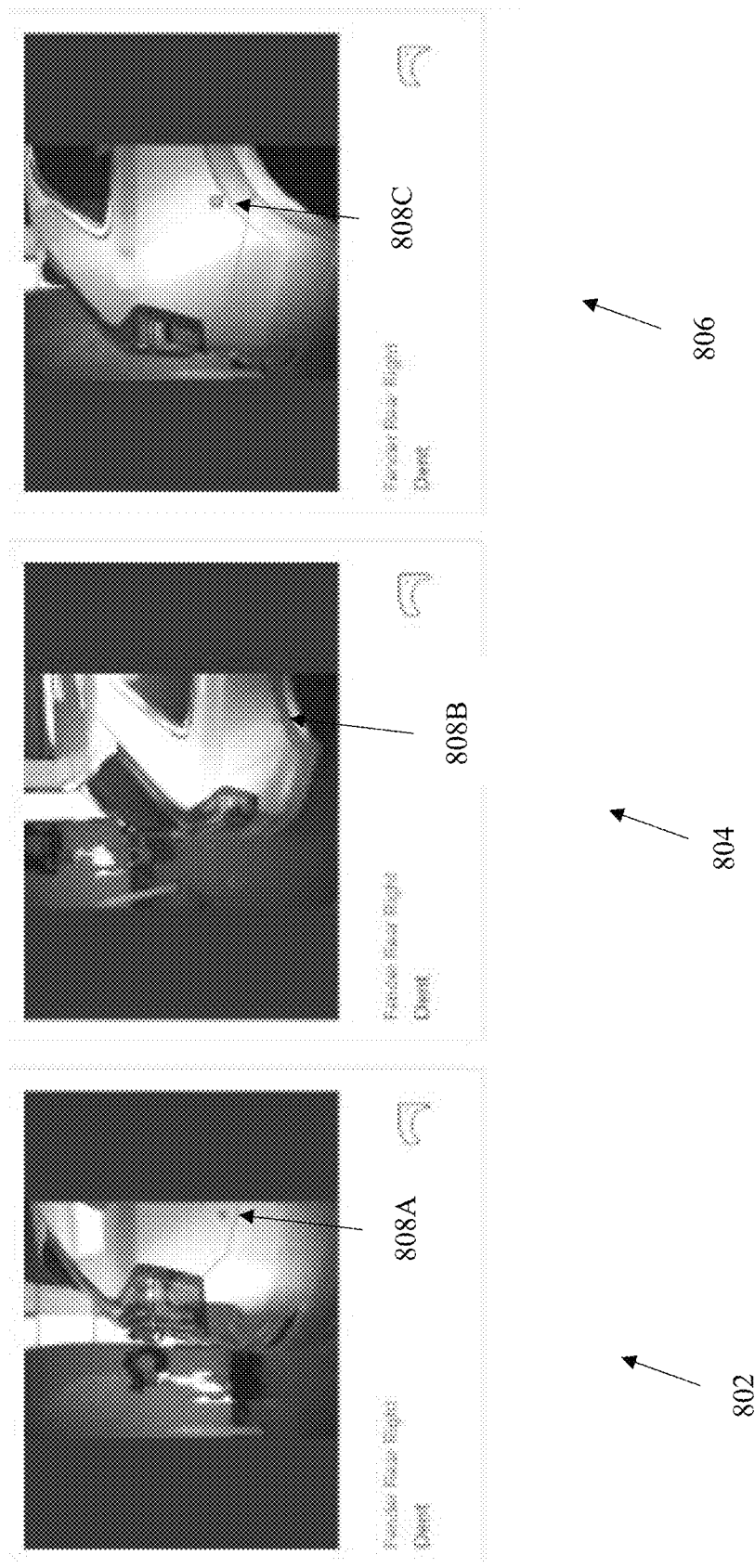
FIG. 8 includes schematics depicting different views and/or zoom levels of a region of a car with damage, in accordance with some embodiments of the present invention.
Figure 9:
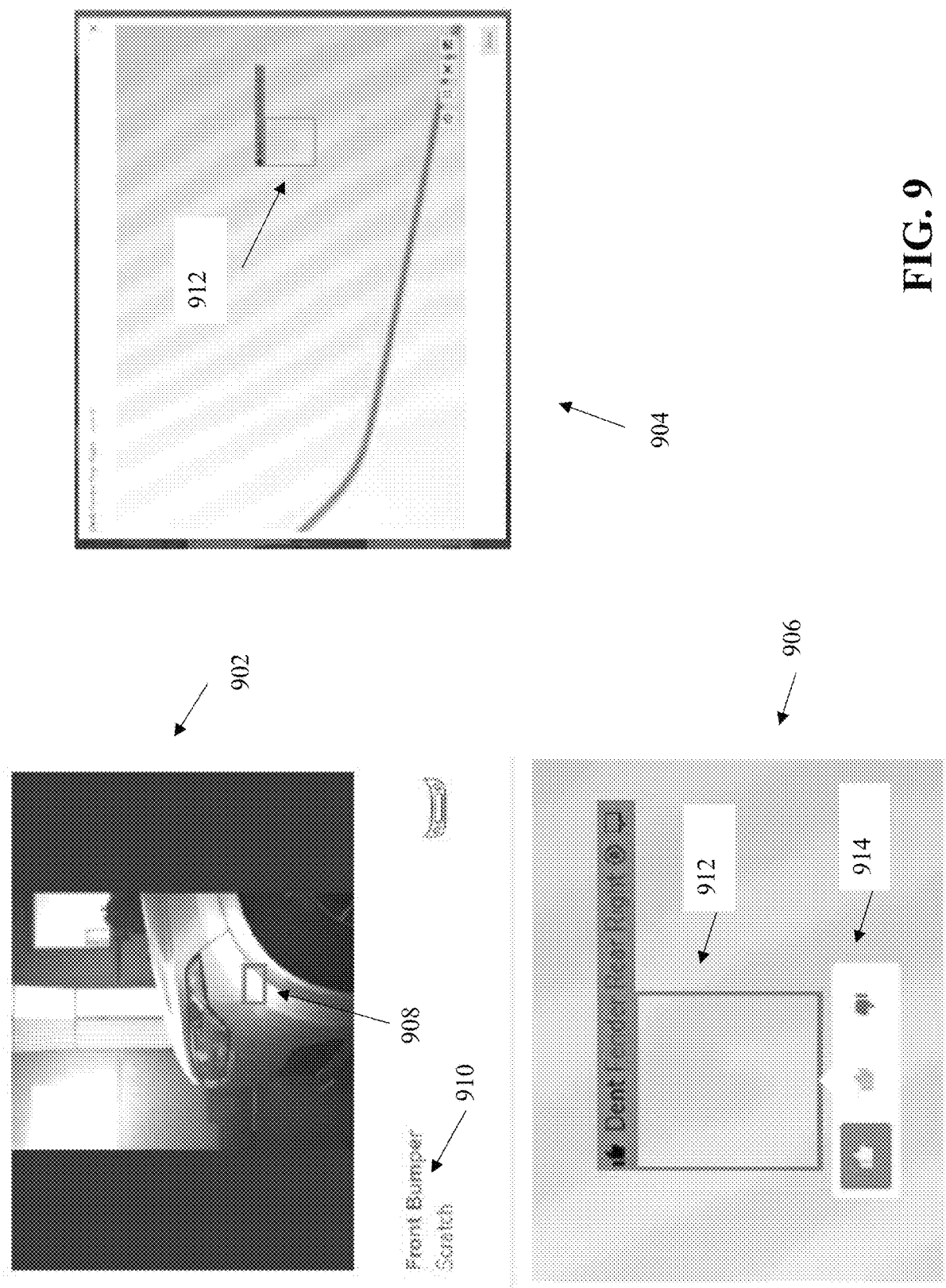
FIG. 9 includes schematic depicting various levels of interaction with an identified region of damage on a vehicle, in accordance with some embodiments of the present invention.

Reference is now made to FIG. 1, which is a flowchart of a method of image processing for detection of damage on a vehicle by identifying redundancy of candidate regions in images, in accordance with some embodiments of the present invention. Reference is also made to FIG. 2, which is a block diagram of components of a system 200 for image processing for detection of damage on a vehicle by identifying redundancy of candidate regions in images, in accordance with some embodiments of the present invention. Reference is also made to FIG. 3, which is a schematic depicting spatial correlation of images of a vehicle, in accordance with some embodiments of the present invention. Reference is also made to FIG. 4, which is a schematic depicting temporal correlation of images of a vehicle, in accordance with some embodiments of the present invention. Reference is also made to FIG. 5, which is a flowchart of a method of operating a user interface, optionally an interactive GUI, presenting identified physical damage regions on a vehicle, in accordance with some embodiments of the present invention. Reference is also made to FIG. 6, which is a schematic of exemplary views of a 3D model of a vehicle presented within a UI, in accordance with some embodiments of the present invention. Reference is also made to FIG. 7, which includes exemplary images of regions of a vehicle with marked detected regions of damage, in accordance with some embodiments of the present invention. Reference is also made to FIG. 8, which includes schematics depicting different views and/or zoom levels of a region of a car with damage, in accordance with some embodiments of the present invention. Reference is also made to FIG. 9, which includes schematic depicting various levels of interaction with an identified region of damage on a vehicle, in accordance with some embodiments of the present invention.

Referring now back to FIG. 2, system 200 may implement the features of the method and/or UI described with reference to FIGS. 1 and/or 3-9, by one or more hardware processors 202 of a computing device 204 executing code instructions stored in a memory (also referred to as a program store) 206.

Computing device 204 may be implemented as, for example, a client terminal, a server, a virtual machine, a virtual server, a computing cloud, a group of interconnected computers, and the like.

Multiple architectures of system 200 based on computing device 204 may be implemented.

In an exemplary centralized implementation, computing device 204 storing code 206A may be implemented as one or more servers (e.g., network server, web server, a computing cloud, a virtual server) that provides services (e.g., one or more of the acts described with reference to FIG. 1) to one or more servers 218 and/or client terminals 208 over a network 210, for example, providing software as a service (SaaS) to the servers 218 and/or client terminal(s) 208, providing software services accessible using a software interface (e.g., application programming interface (API), software development kit (SDK)), providing an application for local download to the servers 218 and/or client terminal(s) 208, and/or providing functions using a remote access session to the servers 218 and/or client terminal(s) 208, such as through a web browser and/or viewing application. Client terminals 208 may be located in different geographical locations, for example, different vehicle dealerships and/or different garages and/or different vehicle inspection centers. For example, client terminals 208 may sent locally captured time-spaced image sequences of a vehicle captured by multiple image sensors positioned at different views to computing device 204. Computing device 204 reduces redundancy of detected damage, and/or perform other image processing and/or analysis as described herein. One or more outcomes described herein may be provided by computing device 204 to respective client terminals 208, for example, selected images with detected damage, and/or recommendation for fixing the damage, and/or map of detected damage.

In an exemplary localized implementation, code 206A is locally executed by computing device 204. For example, computing device 204 is installed in a local vehicle dealership and connected to locally installed cameras positioned at different views. Time-spaced image sequences of a vehicle captured by the locally installed cameras are locally analyzed and/or processed as described herein. Outcomes may be presented on a display associated with computing device 204.

Code 206A and/or analysis code 220B may include image processing code and/or one or more machine learning models, as described herein. Exemplary architectures of machine learning model(s) may include, for example, one or more of: a detector architecture, a classifier architecture, and/or a pipeline combination of detector(s) and/or classifier(s), for example, statistical classifiers and/or other statistical models, neural networks of various architectures (e.g., convolutional, fully connected, deep, encoder-decoder, recurrent, transformer, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised, and/or reinforcement learning. Machine learning models may be trained using supervised approaches and/or unsupervised approaches.

Image sensors 212 are arranged at different views, optionally with at least some overlap, for capturing images of different parts of the surface of the vehicle. Image sensors 212 may be, for example, standard visible light sensors (e.g., CCD, CMOS sensors, and/or red green blue (RGB) sensor). Computing device 204 receives sequences of time-spaced images captured by multiple image sensors 212 positioned in different views, for example cameras.

Image sensors 212 may transmit captured images to computing device 204, for example, via a direct connected (e.g., local bus and/or cable connection and/or short range wireless connection), and/or via a network 210 and a network interface 222 of computing device 204 (e.g., where sensors are connected via a wireless network, internet of things (IoT) technology and/or are located remotely from the computing device).

Network interface 222 may be implemented as, for example, a wire connection (e.g., physical port), a wireless connection (e.g., antenna), a network interface card, a wireless interface to connect to a wireless network, a physical interface for connecting to a cable for network connectivity, and/or virtual interfaces (e.g., software interface, application programming interface (API), software development kit (SDK), virtual network connection, a virtual interface implemented in software, network communication software providing higher layers of network connectivity).

Memory 206 stores code instructions executable by hardware processor(s) 202. Exemplary memories 206 include a random access memory (RAM), read-only memory (ROM), a storage device, non-volatile memory, magnetic media, semiconductor memory devices, hard drive, removable storage, and optical media (e.g., DVD, CD-ROM). For example, memory 206 may code 206A that execute one or more acts of the method described with reference to FIGS. 1 and/or 3-9.

Computing device 204 may include data storage device 220 for storing data, for example, sequences of time-spaced image repository 220A for storing sequences of time-spaced images captured by imaging sensors 212, and/or analysis code repository 220B which may store code (e.g., set of rules, ML model) for generating recommendations for fixing components according to a pattern of detected damage. Data storage device 220 may be implemented as, for example, a memory, a local hard-drive, a removable storage unit, an optical disk, a storage device, a virtual memory and/or as a remote server 218 and/or computing cloud (e.g., accessed over network 210).

Computing device 204 and/or client terminal(s) 208 include and/or are in communication with one or more physical user interfaces 224 that include a mechanism for inputting data and/or for viewing data, for example, a display for presenting sample images with detected damage regions and/or for entering a set of rules for recommendations on how to fix patterns of different types of damage. Exemplary user interfaces 224 include, for example, one or more of, a touchscreen, a display, a keyboard, a mouse, and voice activated software using speakers and microphone.

Referring now back to FIG. 1, at 102, multiple time-spaced image sequences depicting one or more regions of a vehicle, are accessed. For example, obtained from image sensors (e.g., cameras), from a data storage device storing images captured by the image sensor, and/or obtained over a network connection (e.g., when a server and/or cloud based service performs the analysis of image captured by image sensors at multiple different geographical locations).

The time-spaced image sequences are captured by multiple image sensors positioned at a multiple different views (e.g., poses), for example, at different locations and/or different poses relative to the car. For example, cameras may be installed along an arch and/or frame that surrounds at least a portion of the car (e.g., sides and top).

Each time-spaced image sequence includes multiple images captured by an image sensor over a time interval, where each image is captured at a different time. For example, frames of a video captured at a certain frame rate, for example, one frame every second, one frame every three seconds, and the like.

The image sensors and vehicle may move relative to one another. For example, the vehicle may be moving relative to the image sensors, for example, slowly driven and/or pulled through a frame on which the image sensors are installed. In another example, the vehicle remains still, while the frame on which the image sensors are installed in moved across the body of the vehicle. In yet another example, the pose of the image sensors is changed, for example, the image sensors are swept across the surface of the body of the vehicle.

The individual images of the time-spaced image sequences may vary in the region(s) of the vehicle depicted, for example, a subsequent image may depict a lateral displacement of the region of the body of the vehicle depicted in a preceding image. The variation of the region(s) of the vehicle depicted in the image may be a function of relative motion between the vehicle and image sensors, and/or a function of the frame rate at which the images are captured.

Images of the time spaced-image sequence may be synchronized to be captured at substantially the same time. For example, two cameras may be set to capture overlapping images of the body vehicle at substantially the same time.

The rate of relative motion between the image sensors and/or the frame rate may be selected to obtain a target overlap between images of the time-spaced image sequences, for example, about 10-30%, or 30-60%, or 5-25%, or 25-50%, or 50-75%, or other values. The overlap may be selected, for example, in view of approaches for reducing redundancy described herein.

The time-spaced image sequences may be selected to have a resolution and/or zoom level for enabling identifying redundancy with a target accuracy, for example, a dent of about a 2 centimeter diameter on the vehicle may represent about 1%, or 5%, or 10% of the area of the image, or other values such as according to approaches used for reducing redundancy.

The regions depicted in the time-spaced image sequence may be of a body of a vehicle, optionally excluding the bottom of the car. Examples of regions depicted in the time-spaced image sequences include: front bumper, rear bumper, hood, doors, grill, roof, sunroof, windows, front wind shield, read wind shield, and trunk.

At 104, one or more pre-processing approaches may be implemented. The pre-processing approaches may be implemented on the raw time-spaced image sequences.

Optionally, each of the time-spaced images of each sequence may be classified into a classification category. The classification category may correspond to a physical component of the vehicle, optionally according to regions which may be replaceable and/or fixable. Examples of classification categories include: front bumper, rear bumper, hood, doors, grill, roof, sunroof, windows, front wind shield, read wind shield, and trunk. Alternatively or additionally, the classification categories may include sub-regions of components. The sub-regions may be selected according to considerations for a recommendation of whether the component should be fixed or replaced. For example, a driver's side door may be divided into 4 quadrants. Damage to 2 or more quadrants may generate a recommendation to replace the door, rather than fixing damage to the 2 or more quadrants. The time-spaced images may be clustered into multiple clusters, where each cluster corresponds to one of the classification categories. One or more features described herein, such as identification of damage, performing spatiotemporal correlation and/or multi-level redundancy validation, identification of redundancy, detection of damage, and/or other features described herein, may be performed per cluster. Analyzing each cluster may improve the recommendation for whether the physical component corresponding to the cluster should be fixed or replaced.

The classification may be performed, for example, by a machine learning model (e.g., detector, classifier) training on a training dataset of image of different physical components labelled with a ground truth of the physical component, and/or by image processing code that analyses features of the image to determine the physical component (e.g., shape outline of the physical component, pattern of structured light indicating curvature of the surface of the physical component, and/or key features such as door handle or designs.

Alternatively or additionally, one or more common physical location are segmented from the time-spaced image sequences. The common physical location may be the physical component, or part thereof, of each cluster. One or more features described herein, such as identification of damage, performing spatiotemporal correlation and/or multi-level redundancy validation, identification of redundancy, detection of damage, and/or other features described herein, may be performed for the segmented portion of the image, rather than for the image as a whole. Analyzing the segment may improve performance (e.g., accuracy) of the analysis, by analyzing the physical component while excluding other portions of the vehicle which are not related to the common physical component. For example, the driver side (front)

door is being analyzed to determine the extent of damage, which is unrelated to damage to the rear passenger (back) door. The segment may include the driver side door, while excluding the rear passenger door depicted in an image.

Alternatively or additionally, for time-spaced image sequences captured during motion between the vehicle and image sensors, filtered time-spaced image sequences are computed by removing background from the time-spaced image sequences that doesn't move. The background for removal may be identified as regions of the time-spaced images that doesn't move according to a predicted motion between the vehicle and the image sensors. For example, when the vehicle is moving relative to the image sensors at about 10 centimeters a second, background that does not more at all, or moves much more slowly than about 10 centimeters a second, and/or background that moves much faster than about 10 centimeters a second may be removed. Such background is assumed to not be part of the vehicle body. One or more features described herein, such as identification of damage, performing spatiotemporal correlation and/or multi-level redundancy validation, identification of redundancy, detection of damage, and/or other features described herein, may be performed on the filtered time-spaced image sequences.

At 106, candidate regions of damage are identified in the time-spaced image sequences. One or more candidate regions of damage may be identified per image of the time-spaced image sequences.

The candidate regions of damage may be identified by feeding each image into a machine learning model (e.g., detector) trained on a training dataset of sample images of region(s) of a body of a sample vehicle labelled with ground truth indicating candidate regions of damage and optionally including images without damage. The machine learning model may generate the candidate region of damage as an outcome, for example, an outline encompassing the damage (e.g., bounding box), a tag indicating presence of damage in the image, markings (e.g., overlay) of the identified damage, and the like. In another example, the candidate regions of damage may be identified by image processing code, for example, by shining structured light on the body of the vehicle, and extracting features from the image to identify disruption of the a pattern of the structured light on the body of the vehicle. The disruption of the patter of the structured light may indicate an aberration on the smooth surface of the body, such as scratch and/or dent, likely being damage.

At 107, the identified candidate regions of damage and/or images depicting the identified candidate regions of damage, may be used for pre-processing and/or computation of values.

Optionally, a confidence score is computed for each candidate region of damage. The confidence score may be computed according to one or more of, optionally a combination of the following (e.g., sub-scores): overlap, partial visibility, errors in transformation, angle consistency, and damage characteristics. The sub-scores may be weighted and/or transformed using a function to a probability that is used to determine whether a pair of images depicts the same damage region or not, i.e., redundancy as detailed herein. A subset of the candidate regions of damage having confidence scores above a confidence threshold. The multi-level redundancy validation may be performed for the subset of candidate regions of damage. Using the confidence score may help ensure that high-confidence, redundant damage regions are selected for multi-level redundancy validation.

Additional exemplary details regarding the overlap used to compute the confidence score are now provided. The confidence score may be computed for a first candidate region of damage depicted in a first image according to overlap with a second candidate region(s) of damage depicted in a second image(s). The higher the amount of overlap between the first and second candidate regions of damage, the higher the likelihood that the first and second candidate regions of damage represent the same region of damage. Overlap may refer, for example, to one or more of: similarity between size of the first candidate region of the first image and the second candidate region of the second image, ratio of the first candidate region and the second candidate region, and a distance between a center of the first candidate region and the second candidate region. The first image may be registered to the second image, or the second image may be registered to the first image. Registration between the first image and the second image(s) may be computed by mapping the first image and the second image(s) to a common coordinate system. The overlap between the first candidate region of damage and the second candidate region(s) of damage may be computed according to the common coordinate system.

The confidence score may take into account partial visibility of the candidate region and/or errors in transformation between a first candidate region of damage depicted in a first image to a second candidate region of damage depicted in a second image, where the transformation may be computed using approaches described herein. The confidence score may be reduced in cases of partial visibility and/or errors in transformation. The confidence score may be adjusted according to the amount of partial visibility and/or amount of error in the transformation. Partial visibility may occur when a portion of the damage is visible in the image.

Additional exemplary details regarding the angle consistency used to compute the confidence score are now provided. A first pose of an image sensor that captured a first image depicting the respective candidate region of damage, may be obtained and/or computed. The pose may be known, such as measured and/or set and/or computed in advance, for example, where the pose of the image sensor is fixed with respect to a defined location on the vehicle depicted in the captured image. In another example, the pose may be computed, for example, by identifying onc or more known markers (e.g., as described herein) in the image, and computing the pose of the image sensor according to the appearance of the marker(s) in the image. A second pose of the image sensor that captured a second image depicting the respective candidate region of damage may be obtained and/or computed. A similarity between the first pose and the second pose is computed. A high similarity indicates high probability that the same image sensor was used to capture the first image and the second image, indicating a high confidence.

Damage characteristics used to compute the confidence score may indicate likelihood of actual damage versus artifacts for the respective candidate region of damage. Damage characteristics may be computed by analyzing at least one image depicting the respective candidate region of damage. The analysis may be performed by feeding the image into a machine learning model (e.g., neural network) which may be trained on images depicting actual damage and images depicting artifacts, labelled accordingly with a ground truth. In another example, the analysis may be performed using other approaches, such a feature extraction and analysis of the extracted features to identify patterns indicative of actual damage versus artifacts.

Optionally, images captured by different images sensors and depicting candidate regions of damage are analyzed to identify lightening conditions. Each image may be analyzed to identify and/or measure the lighting conditions depicted therein, for example, poor lighting, spot light, bright light, shadow, reflections, and the like. Differences in lighting conditions may arise for different vehicles and/or for different images of the same vehicle, due to, for example, color of the vehicle, dust on the vehicle, wax applied to the vehicle, lighting from the sun, shadows due to objects in the field of view, reflections off a window of the vehicle, and the like. The lighting conditions may be analyzed, for example, by feeding into a machine learning model (e.g., neural network, classifier, regression model) which may be trained on images depicting different lighting conditions, labelled accordingly with a ground truth. In another example, lighting conditions may be analyzed, for example, by extracting features from the image and/or by analyzing patterns of pixel intensities in the image. The lighting conditions may be taken into account when computing one or more values described herein and/or executing one or more processes described herein, for increasing likelihood of correctly removing redundancies.

Optionally, a lighting intensity score is computed, for example, by the machine learning model and/or other approaches. The lighting intensity score may be associated with the confidence score computed for each candidate region of damage. The lighting intensity score may be used to optimize for maximum detection rate (e.g., recall) by setting optimal threshold for different lighting intensities. For example, using a look-up table that maps each intensity range to a threshold and/or by training a boosting algorithm to output singe confidence based on the two parameters (i.e., confidence, lighting intensity score).

Optionally, an overlap threshold indicating amount of overlap between a first image captured by a first image sensor depicting a first candidate region of damage, and a second image captured by a second image sensor depicting a second candidate region of damage, is dynamically adjusted according to the identified lighting conditions. The overlap threshold may be used for computing the confidence score, as described herein. The overlap threshold may be dynamically adjusted for accounting for, for example, shadow, reflection, and/or other lighting condition inconsistencies described herein, for reducing probability of mis-identifying redundant damage regions.

At 108, a multi-level redundancy validation is performed based on the time-spaced image sequences obtained from the image sensors at different heights and/or different angles relative to the vehicle.

The multi-level redundancy validation may be performed to remove redundantly detected candidate regions of damage, for obtaining unique regions of damage to the vehicle, representing a single physical damage region.

The multi-level redundancy validation may be performed by separately executing spatial correlation between images captured by different images sensors at different heights and/or different angles 108A and executing temporal correlation between consecutive images captured by each image sensor 108B, for example, using different processing pipelines described herein.

An exemplary approach for executing spatial correlation 108A is described for example, with reference to FIG. 3.

An exemplary approach for executing temporal correlation 108B is described for example, with reference to FIG. 4.

The temporal correlation computed in 108B may be combined with the spatial correlation in 108A to obtain the spatiotemporal correlation described herein.

The multi-level redundancy validation may include validating persistence of each candidate region of damage across a threshold number of consecutive frames 108C.

Persistence of each candidate region of damage may be validated by tracking each respective candidate region of damage across multiple consecutive frames. The candidate region may be tracked over multiple consecutive frames to help ensure that it is the same candidate region that is being tracked, rather than different candidate regions. The candidate region may be tracked over multiple consecutive frames obtained from the same image sensor and/or obtained from different image sensors. The candidate region may be temporally and/or spatially tracked over multiple consecutive frames, by following the same candidate region when the candidate region remains substantially the same location over the multiple consecutive frames (e.g., when there is no relative movement between the vehicle and image sensor), or when the candidate regions appears to be displaced to different locations over the multiple consecutive frames (e.g., when there is relative movement between the vehicle and image sensor). The candidate region may be tracked over multiple consecutive frames, for example, based on optical flow approaches, feature extraction, mappings of features, registration of images, and the like.

A number of consecutive frames in which each respective candidate region is detected during the tracking, representing the same candidate region, is determined. The respective candidate region of damage may be designated as an actual region of damage when the number of frames in which the respective candidate region of damage appears is greater than a selected threshold number of consecutive frames. The threshold may be selected, for example, according to lighting conditions, location of damage on the vehicle, type of image sensor, and the like. The threshold may be selected according to desired probability of correctly determining the actual region of damage. Alternatively, the respective candidate region of damage may be designated as non-actual damage, for example, transient visual artifacts, when the number of frames in which the respective candidate region of damage appears is less than the threshold number of consecutive frames. For example, a shadow appearing on the car may appear to be a candidate region of damage. However, in subsequent frames, when the shadow disappears or appears to move to a different location on the car, i.e., is non-persistent, the candidate region of damage may be determined to be a visual artifact.

Candidate regions of damage which are determined to represent actual regions of damage are further processed to identify redundancy, as described herein.

An additional exemplary approach for executing spatial correlation is now described. The exemplary approach may be used in addition to, and/or as an alternative to, other approaches for executing spatial correlation described herein. Each of the images captured by different images sensors and depicting candidate regions of damage may be analyzed identify at least one predefined marker. The predefined marker may be a spatial visual marker visible in the field of view (FOV). The predefined marker may be a known physical features of the vehicle, for example, a door, a window, a bumper, a wheel, a door handle, gas tank cover, and the like. The predefined marker may be identified, for example, by feeding the image into a machine learning model trained to detect and/or segment the predefined marker (e.g., neural network, detector), by identifying known features of the marker (e.g., edge detection, intensity pattern, line patterns), and the like. The predefined marker(s) (or features extracted from the predefined marker(s) detected in a first image captured by a first image sensor depicting a first candidate region of damage, may be matched with at least one predefined marker detected in a second image captured by a second image sensor depicting a second candidate region of damage. The matching may be done in two dimensions. The matching may be done, for example, by registering the first image to the second image and registering the first marker to the second marker, by transforming both images to a common plane, and the like. The matching of the markers between the two images enables computing a mapping between the two candidate regions of damage of the two images. A three dimensional mapping may be computed between a first pose of the first sensor and a second pose of the second sensor. The 3D mapping may be computed according to the two dimensional location of the candidate region of damage and intrinsic information of the different image sensors. The 3D mapping may be used to identify redundancy by validating that the first candidate region of damage captured by the first image sensor is the same as the second candidate region of damage captured by the second image second.

Additional exemplary details to geometrically match damage regions using 3D or pseudo 3D, to identify redundancies, are now described. The markers may be depicted in each frame and matched in 2D. Using intrinsic information regarding the sensors together with the 2D coordinates of the markers, mathematical optimization that approximates the sensor's position relative to another sensor in 3D may be computed. The result of the computation may be used to compute epipolar lines that match points with lines on the corresponding sensor. This approach may be used for geometrical matching of candidate damage regions through 3D or pseudo 3D.

Alternatively, the spatiotemporal correlation and/or multi-level redundancy validation may be performed together (e.g., simultaneously and/or in a common processing pipeline).

The spatiotemporal correlation and/or multi-level redundancy validation may be performed for each pair of images. Multiple pairs of images may be defined, where a pair may include a first image and a second image from a same sequence, or from different sequences. The pair of images may be of a common segmented physical location. The pair may be of images of a common cluster. The segmentation and/or clustering may reduce the number of pairs of images to the most relevant pairs of images that most likely correspond to a same physical location of the vehicle. Reducing the number of image pairs improves computational performance of the processor and/or computing device, for example, by reducing processing time, reducing utilization of processing resources, reducing utilization of memory, and the like.

The spatiotemporal correlation and/or multi-level redundancy validation may be performed by correlating between different images of different sequences captured by different image sensors oriented at different views, optionally at synchronized points in time, for example, correlating between different images of different sequences captured at substantially the same time. The different images of different image sensors at different views may overlap at the common physical location of the vehicle captured at substantially the same time. The aforementioned may be an example of spatial correlation 108A for images at different poses.

Alternatively or additionally, the spatiotemporal correlation and/or multi-level redundancy validation may be performed by correlating between images of a same sequence captured by a same image sensor in a fixed pose, where the images are captured at different times. The vehicle and image sensor are moving relative to one another. The aforementioned may be an example of temporal correlation 108B.

Alternatively or additionally, the spatiotemporal correlation and/or multi-level redundancy validation may be performed by correlating between different images of different sequences captured by different image sensors at different views, captured at different points in time. The different images of different image sensors at different views may overlap at the common physical location of the vehicle. The aforementioned may be an example of a combination of spatial correlation 108A and temporal correlation 108B.

Optionally, the spatiotemporal correlation and/or multi-level redundancy validation is performed according to matching features detected on a first image and a second image of a pair. Features are detected in the first image and the second image of the pair. The features may be detected using image processing approaches, for example, scale-invariant feature transform (SIFT), Speeded-Up Robust Feature (SURF), Orientated FAST and Robust BRIEF (ORB), and the like. The features detected in the first image may be matched to features detected in the second image, for example, using a brute-force matcher, Fast Library for Approximate Nearest Neighbors (FLANN) matcher, and the like.

The matched features may be within the respective candidate regions of damage of the first image and second image, excluding features external to the candidate regions of damage. Alternatively, the matched features include both the features within the candidate regions of damage and the features external to the candidate regions of damage.

An exemplary not necessarily limiting approaches for spatial correlation 108A is now described. A transformation between the first image captured by a first image sensor oriented at a first view and the second image captured by a second image sensor oriented at a second view different than the first pose, is computed. The transformation may be computed according to the identified features of the first image that match to the corresponding identified features of the second image. The transformation may be computed, for example, as a transformation matrix. The first image and the second image each depict a respective candidate region of damage, referred to herein as a first candidate region of damage (for the first image) and a second candidate region of damage (for the second image). The transformation may be computed as a transformation matrix. The transformation may be computed between the candidate region of the first image and the candidate region of the second image, according to features of the first candidate region of the first image that match to features of the second candidate region of the second image. Features external to the first image and/or the second image may be excluded from the computation of the transformation. The transformation may be applied to the first image to generate a transformed first image depicting a transformed first candidate region of damage. A correlation may be computed between the second candidate region of damage and the transformed first candidate region of damage. Redundancy of the first candidate region of damage and the second candidate region of damage when the correlation is above a threshold. The threshold may indicate, for example, an amount of overlap of the second candidate region of damage and the transformed first candidate region of damage, at the common physical location. In another example, the threshold may indicate a selected likelihood (e.g., probability) corresponding to a value of the correlation. For example, a correlation of 0.85 may correspond to a probability of 85% of matching.

Redundancy refers to the first candidate region of damage of the first image corresponding to a same physical location on the vehicle as the second candidate region of damage of the second image. Or in other words, that the same physical location on the vehicle is depicted in both the first image and the second image as the first and second candidate regions of damage.

An exemplary not necessarily limiting approaches for temporal correlation 108B is now described. The temporal correlation may be computed for a first image and a second image captured by a same image sensor at different times. The vehicle and image sensor may be moving relative to each other, such that the first image and the second image depict different regions of the vehicle, with possible overlap in candidate regions of damage. The relative movement may occur by the vehicle moving relative to the image sensor and/or the at least one image sensor moving relative to the vehicle.

A predicted candidate region of damage may be computed. The predicted candidate region of damage may include a location of where the first candidate region of damage depicted in the first image is predicted to be located in the second image. The prediction may be computed according to a time difference between capture of the first image and the second image, and/or according to a relative movement between the vehicle and the image sensor. The prediction may be computed, for example, by applying an image motion approach, for example, applying optical flow to features of the image for displacement of the image according to the relative movement occurring between the time of capture of the first and second images, and the like. For example, when the first image and the second image are captured about one second apart, during which time the vehicle moved about 10 centimeters past the image sensor, the first image and/or the first candidate region of damage is displaced an amount of pixels corresponding to 10 centimeters. A correlation between the predicted candidate region of damage and the second candidate region of damage may be computed. Redundancy may be identified when a correlation between the first candidate region of damage and the second candidate region is above a threshold. The threshold may indicate, for example, an amount of overlap of the second candidate region of damage and the transformed first candidate region of damage, at the common physical location. In another example, the threshold may indicate a selected likelihood (e.g., probability) corresponding to a value of the correlation. For example, a correlation of 0.85 may correspond to a probability of 85% of matching.

At 110, redundancy in the candidate regions of damage corresponding to a common physical location of the vehicle denoting a single physical damage region on the vehicle, is identified. Redundancy may be identified for a pair of images when the first candidate region of damage of the first image likely corresponds to the same physical region of the vehicle as the second candidate region of damage of the second image of the pair of images.

The identification of redundancy may be performed for identifying one or more single physical damage regions within a common physical component of the vehicle. For example, two damage regions on a driver side door, one damage region may be towards the left (front of the vehicle), and a second damage region may be towards the right (back of the vehicle).

The identified redundancy may be removed and/or ignored to obtain the single physical damage region. The identification of redundancy may help improve recommendations for fixing of the damage, by avoiding erroneous recommendations for example, based on erroneous multiple damage regions detected in multiple images when only a single damage region is present. In such a case, the erroneous recommendation to replace an entire part due to extensive damage is avoided, while a correct recommendation to perform a spot fix of a small region of damage may be provided.

Optionally, redundancy is identified by analyzing each image depicting a candidate region of damage to identify a 3-point correlation. The 3-point correlation includes a timestamp associated with the image indicating the time when the image was captured, a pose of an image sensor capturing the image (obtained and/or computed as described herein), and alignment of the image which may be performed by transforming the image as described herein. The image depicting the candidate region of damage may be designated as unique when the 3-point correlation associated with the image is non-correlated with another 3-point correlation of another image depicting the candidate region of damage. The image depicting the candidate region of damage may be designated as redundant when the 3-point correlation associated with the image is correlated with another 3-point correlation of another image depicting the candidate region of damage. The correlation between each element of the 3-point correlation may be within a defined error range, to account for variations, for example, in time between capturing of the different image, slight variations in pose of the image sensor, and/or variations in computation of the transformation.

Alternatively or additionally, redundancy identification is performed for the detected candidate regions of damage which are matched to one another using approaches described herein. Each detection may be treated as a "cluster" of occurrences of the same region of damage from different sources. A decision of whether each cluster represents an actual damage or a false detection may be executed. For example, by using a voting approach where it is desired to have at least a predefined number of appearances of the candidate region of damage in each cluster with a confidence above a threshold. In another example, one or multiple voting rules may be used. For example, higher confidence requires less occurrences in the cluster, and a lower threshold required more occurrences. Each combination of vehicle component and label may be analyzed, such as by using a lookup table for decision making, which may optimize the potential recall and precision. It is to be understood that the aforementioned process may be implemented using other approaches, for example, boosted models.

The redundancy may be identified according to the computed spatiotemporal correlation and/or multi-level redundancy validation between time-spaced images of the sequences. Candidate regions of damage that are spatiotemporally correlated with other image in the same time-spaced time sequence and/or in another time-spaced image sequence may be flagged as redundant. The redundant candidate regions may be removed and/or ignored. The candidate regions which are unflagged and/or are not spatiotemporally correlated with other candidate regions represent non-redundant region of damage.

A baseline region represent one candidate region of damage in one of the time-spaced images corresponding to the physical location of the vehicle may be selected. Candidate regions of damage in other time-spaced images that correlate to the same physical location of the vehicle as the baseline region of damage may be ignored. The correlation may be spatiotemporal, for example, overlap in candidate regions of damage of at least a predefined threshold. Candidate regions of damage in other time-spaced images that do not correlate to the same physical location of the vehicle as the base line region of damage and are located in another physical location of the vehicle, may be labelled as actual regions of damage.

At 112, an indication of the common physical location(s) of the vehicle corresponding to the single physical damage region(s) is provided. The common physical location(s) of the vehicle corresponding to the single physical damage region(s) represent the set of actual damage regions (i.e., one or more), after redundancy depicted in the images is accounted for, for example, by being removed and/or ignored.

The indication may be, for example, presented on a display optionally with a user interface (e.g., graphical user interface), used to generate a report for the vehicle, stored on a data storage device, fed into another automated process, and/or forwarded to another device.

At 114, one or more additional features may be performed.

Optionally, a recommendation for fixing the common physical component is computed and/or provided. The recommendation may include, for example, whether to fix the existing damage or replace the damaged physical component. For example, in some instances where there are multiple different physical damage regions on the component, such as on a door, the component of the door may be replaced rather than locally fixing the damage in the multiple different physical damage regions, for example, due to difference in costs of multiple fixes as opposed to a replacement, and/or inability to achieve aesthetics of fixing in comparison to replacement.

The recommendation may be generated by analyzing the single physical damage region(s) within the common physical component of the vehicle. The analysis may be performed by classifying each of the single physical damage regions into a damage category, which may indicate type of damage and/or extend of damage, for example, superficial scratch, deep scratch, dent, broken surface, and the like. The classification may be performed by a machine learning model trained on a training dataset of images depicting different physical damage regions labelled with ground truth labels selected from defined damage categories. The analysis may be based on a combination of one or more of: number of single physical damage regions, pattern of distribution of the single physical damage regions, and/or damage categories. The recommendation may be generated, for example, based on a set of rules and/or using a machine learning model trained on a training dataset of different combinations of number of damage regions, pattern of distribution, and/or damage categories, labelled with a ground truth label indicating the recommendation.

Alternatively or additionally, a map of the physical components of the vehicle marked with respective locations of each of the single physical damage regions may be generated. The map may be generated based on images depicting multiple different regions of the vehicle. The map may be presented within an interactive GUI, where a user may click on an indication of each physical damage region to obtain additional details, for example, recommendation, type of damage, estimated cost to fix, and the like.

Alternatively or additionally, a user interface, optionally an interactive GUI, may be generated and/or presented on a display.

Referring now back to FIG. 3, the spatial correlation depicted with reference to FIG. 3 may be implemented, for example, as described with reference to 108A of FIG. 1. A first image sensor 302 and a second image sensor 304 set at different views relative to a vehicle 306 are shown. Vehicle 306 has a region of damage 308 on its roof. Image 310 is captured by first image sensor 302. Image 312 is captured by second image sensor 304. Images 310 and 312 may be captured at substantially the same time, for example, when vehicle 306 is moving relative to image sensors 302 and 304. Damage 308 is depicted as damage 314 in image 310, and as damage 316 in image 312. However, based upon inspection of images 310 and 312, it is unclear whether damage 314 and damage 316 correspond to the same physical damage region on vehicle 306 (damage 308) or not, i.e., is there redundancy or not. As such, damage region 318 is referred to as a first candidate region of damage, and damage 320 is referred to as a second candidate region of damage, until the redundancy is resolved.

Embodiments described herein identify redundancy, for example, by identifying features 318 in image 310 and corresponding matching features 320 in image 312. A transformation (e.g., transformation matrix) may be computed between image 310 and 312 according to matching features 318 and 320. The transformation may be applied to first image 310 to generate a transformed first image. A correlation may be computed between second image 312 and the transformed first image. Redundancy of first candidate region of damage 314 and second candidate region of damage 316 may be identified when the correlation is above a threshold.

Referring now back to FIG. 4, the temporal correlation depicted with reference to FIG. 4 may be implemented, for example, as described with reference to 108B of FIG. 1. An image sensor 402 is set relative to a moving vehicle 406 having a region of damage 408 on its side. A first image 410 is captured by image sensor 402 at time T1. A second image 412 is captured by the same image sensor 402 at time T2. Between T1 and T2, vehicle 406 has advanced past image sensor 402, optionally a predefined distance. Damage 408 is depicted as damage 414 in image 410, and as damage 416 in image 412. However, based upon inspection of images 410 and 412, it is unclear whether damage 414 and damage 416 correspond to the same physical damage region on vehicle 406 (damage 408) or not, i.e., is there redundancy or not. As such, damage region 418 is referred to as a first candidate region of damage, and damage 420 is referred to as a second candidate region of damage, until the redundancy is resolved. Embodiments described herein identify redundancy, for example, by predicting the location of first candidate region of damage 414 in second image 412. The prediction may be computed, for example, by applying an image motion approach, for example, applying optical flow to features of first image 410 and/or first candidate damage region 414 for displacement thereof according to the relative movement occurring between the time of capture of first image 414 and second image 416, and the like. For example, when first image 410 and second image 412 are captured about one second apart, during which time the vehicle moved about 10 centimeters past the image sensor, first image 410 and/or first candidate region of damage 414 is displaced an amount of pixels corresponding to 10 centimeters.

Embodiments described herein identify redundancy, for example, by computing a correlation between the predictions of displacement of first candidate region of damage 414 and second candidate region of damage 416. Redundancy of first candidate region of damage 414 and second candidate region of damage 416 may be identified when the correlation is above a threshold.

Referring now back to FIG. 5, features of the method described with FIG. 5 may be implemented, for example, with reference to features 112 and/or 114 described with reference to FIG. 1.

At 502, one or more representations (e.g., images, 3D model) of the vehicle are presented within the user interface (UI), optionally within the GUI.

Optionally, indication(s) of damage each corresponding to a single physical damage area at a certain physical location of the vehicle (computed as described herein) may be visually indicated on the representation of the vehicle, for example, marked by a boundary (e.g., bounding box) and/or color coded, and the like.

Optionally, regions of damaged which are identified as non-redundant may be indicated on the image of the vehicle. The non-redundant regions of damage may be identified, for example, as described with reference to FIG. 1.

Optionally, a 3D representation of the vehicle is presented within the UI. Parameters of the vehicle (e.g., make, model, year, color, and the like) may be mapped to a predefined 3D model of the vehicle, which may be selected from multiple predefined 3D model templates of vehicles.

The representation (e.g., image) of the vehicle may be segmented into multiple components, and/or the segmented components may be predefined. Components may represent separate physically distinct components of the vehicle each of which is individually replaceable, for example, based on a parts catalogue. Alternatively or additionally, components may correspond to clusters and/or classification categories described herein.

The components may be defined on the 3D model, for example, boundaries of the components may be marked. In another example, different individual components may be visually enhanced (e.g., colored, filled in, outlined in bold) in response to hovering with a mouse icon over each respective individual component.

Optionally, the detected region(s) of damage are mapped to the components of the representation (e.g., 3D model, images). The representation (e.g., 3D model, images) with the detected region(s) depicted thereon may be presented within the UI, for example, visually indicated by boundaries, color coding, and the like.

At 504, a selection of a component may be received, via the user interface, for example, the user clicked on a certain component.

At 506, in response to the selection of the component, an indication of one or more detected region of damage to the selected component may be presented within the UI. Alternatively, the detected region(s) of damage are presented on the representation of the vehicle within the UI. In such embodiments, the component with detected region(s) of damage may be presented within the UI in isolation from other components, optionally enlarged to better depict the region(s) of damage.

Optionally, each detected region of damage is depicted by a visual marking, for example, within a boundary (e.g., bounding box, circle), a distinct visual overlay over the damage, an arrow pointing to the damage, and a color coding of the damage (e.g., blue, yellow, or other color different than the color of the body of the vehicle).

Optionally, a single boundary may include multiple detected regions of damage corresponding to a single aggregated damage region. For example, there may be multiple scratches and/or dents which may be fairly close together, arising from a single scrap against a corner of a concrete barrier. The multiple scratches and/or dents may be considered as the single aggregated damage region, for example, due to their proximity and/or distribution indicating they occurred by a same mechanism, and/or due to their proximity and/or distribution indication that they are to be fixed together.

At 508, one or more data items are presented within the UI in response to a selection, via the user interface, of one of the detected regions of damage.

Optionally, in response to a selection of one of the detected regions of damage, via the user interface, an interactive selection box for selection by a user of one or more data item(s) is presented within the user interface. The user may receive additional information regarding the selected data item(s). For example, the interactive selection box is for obtaining additional information for severity of the damage. In another example, the interactive selection box is for a user to mark the detected region(s) of damage, for example, reject or accept the damage as significant or not.

The data item(s) may include at least one parameter of the selected detected region of damage. Examples of parameters include: type of damage (e.g., scratch, dent, superficial, deep), recommendation for fixing the damage (e.g., spot fix, straighten and repaint), indication of whether component is to be replaced or not, physical location of the damage on the component, and estimated cost for repair.

Optionally, in response to a selection of one of the detected regions of damage, via the user interface, an enlarged image of the selected region of damage is presented within the user interface. An image depicting the damage within the selected region of damage may be automatically enlarged and/or the damage may be automatically placed in focus.

At 510, instructions for rotating, displacement, and/or zoom in/out of the representation of the vehicle (e.g., 3D model) are obtained via the UI. The UI may be automatically updated accordingly.

At 512, one or more features described with reference to 502-510 may be iterated, for example, for dynamic updating of the UI in response to interactions by a user.

Referring now back to FIG. 6, schematics 602, 604, 606, and 608 depicting different views of the 3D model of the vehicle presented within the UI. Physical components with identified damage regions may be depicted. For example, a door 610, hood 612, and roof 614 with damage may be indicated, for example, colored. The coloring may be a coding, for example, indicating severity of damage to the physical component. Details of the damage regions may be presented in response to selection of a certain component, for example, as described herein.

Referring now back to FIG. 7, schematics 702, 704, and 706 represent examples of images depicting different images 750, 752, and 754 of a vehicle, each with a respective detected region of damage 708, 710, and 712, optionally presented within a UI. Regions of damage 708, 710, and 712 each represent a single physical damage region for which redundancy has been identified and ignored and/or removed, as described herein. A text description 714, 716, and 718 for each respective region of damage 708, 710, and 712, may be presented within the UI, for example, below the respective image 750, 752, and 754.

Referring now back to FIG. 8, schematics 802, 804, and 806 represent examples of different views and/or zoom levels of a fender of a car with damage 808A-C, optionally presented within a UI. A user may interact with the UI to obtain schematics 802, 804, and 806, and/or other views and/or other zoom levels, which may be of the same region and/or other regions of the vehicle. Damage 808A-C of schematics 802, 804, and 806 are of a same single physical damage region, where redundancy has been identified and/or ignored/removed.

Referring now back to FIG. 9, schematics 902, 904, and 906 represent various levels of interaction of a user with a UI. Schematic 902 depicts an image of a region of a car, including a boundary 908 indicating an identified region of damage, i.e., a non-redundant region of damage, as descried herein. A description 910 (e.g., text) of the location and/or type of damage may be presented. Schematic 904 depicts a zoom-in of the region with damage, optionally a zoom-in of boundary 908 and/or including boundary 908. Schematic 904 may be obtained, for example, in response to a user selecting boundary 908 and/or in response to a user zooming in on boundary 908. Schematic 904 includes another boundary 912 around a physical damage to the car. Schematic 906 includes a zoom-in of boundary 912, and interactive icons 914. For example, icons may represent feedback options for a user, for example, to indicate whether the dent is significant or non-significant. Schematic 906 may be presented, for example, in response to a user selecting boundary 912 on schematic 904.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant image sensors will be developed and the scope of the term image sensor is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of image processing for detection of damage to a vehicle, comprising:
   accessing a plurality of time-spaced image sequences depicting a region of a vehicle, captured by a plurality of image sensors positioned at a plurality of different heights and/or angles relative to the vehicle;
   identifying a plurality of candidate regions of damage in the plurality of time-spaced image sequences;
   performing multi-level redundancy validation by:

executing spatial correlation between images captured by different images sensors at different heights and/or different angles, executing temporal correlation between consecutive images captured by each image sensor, and validating persistence of each candidate region of damage across a threshold number of consecutive frames;

identifying redundancy in the plurality of candidate regions of damage corresponding to a common physical location of the vehicle denoting a single physical damage region based on the multi-level redundancy validation; and providing an indication of the common physical location of the vehicle corresponding to the single physical damage region.

2. The computer implemented method of claim 1, wherein validating persistence of each candidate region of damage across a threshold number of consecutive frames comprises:

tracking each respective candidate region of damage across a plurality of consecutive frames for identifying a number of frames of the plurality of consecutive frames for which each respective candidate region is detected; and designating the respective candidate region of damage as an actual region of damage when the number of frames in which the respective candidate region of damage appears is greater than the threshold number of consecutive frames.

3. The computer implemented method of claim 2, further comprising designating the respective candidate region of damage as transient visual artifacts when the number of frames in which the respective candidate region of damage appears is less than the threshold number of consecutive frames.

4. The computer implemented method of claim 1, further comprising:

computing a confidence score for each candidate region of the plurality of candidate regions of damage, wherein the confidence score is computed according to at least one of: overlap, angle consistency, and damage characteristics;

selecting a subset of the plurality of candidate regions of damage having confidence scores above a confidence threshold; and performing the multi-level redundancy validation for the subset of the plurality of candidate regions of damage.

5. The computer implemented method of claim 4, wherein the confidence score is computed for a first candidate region of damage depicted in a first image according to overlap with at least one second candidate region of damage depicted in at least one second image registered to the first image.

6. The computer implemented method of claim 5, wherein registration between the first image and the at least one second image is computed by mapping the first image and the at least one second image to a common coordinate system, wherein the overlap between the first candidate region of damage and the at least one second candidate region of damage is computed according to the common coordinate system.

7. The computer implemented method of claim 6, wherein overlap comprises at least one of: similarity between size of the first candidate region and the at least one second candidate region, ratio of the first candidate region and the at least one second candidate region, and a distance between a center of the first candidate region and the at least one second candidate region.

8. The computer implemented method of claim 4, wherein the confidence score takes into account partial visibility of the candidate region and/or errors in transformation between a first candidate region of damage depicted in a first image and at least one second candidate region of damage depicted in at least one second image.

9. The computer implemented method of claim 1, wherein the angle consistency is computed by:

computing a first pose of an image sensor that captured a first image depicting the respective candidate region of damage, computing a second pose of the image sensor that captured a second image depicting the respective candidate region of damage, and computing a similarity between the first pose and the second pose.

10. The computer implemented method of claim 4, wherein the confidence score is based on damage characteristics indicating likelihood of actual damage versus artifacts for the respective candidate region of damage computed by analyzing at least one image depicting the respective candidate region of damage.

11. The computer implemented method of claim 1, wherein executing spatial correlation comprises:

analyzing each image of the images captured by different images sensors and depicting candidate regions of damage to identify at least one predefined marker;

matching the at least one predefined marker detected in a first image captured by a first image sensor depicting a first candidate region of damage, to the at least one predefined marker detected in a second image captured by a second image sensor depicting a second candidate region of damage, wherein the matching is done in two dimensions;

according to the two dimensional location of the candidate region of damage and intrinsic information of the different image sensors, computing a three dimensional mapping between a first pose of the first sensor and a second pose of the second sensor; and identifying redundancy by validating that the first candidate region of damage captured by the first image sensor is the same as the second candidate region of damage captured by the second image second according to the 3D mapping.

12. The computer implemented method of claim 11, wherein the at least one predefined marker is selected from: a door, a window, a bumper, and a wheel.

13. The computer implemented method of claim 1, further comprising:

analyzing each image of the images captured by different images sensors and depicting candidate regions of damage to identify lightening conditions; and dynamically adjusting an overlap threshold indicating amount of overlap between a first image captured by a first image sensor depicting a first candidate region of damage, and a second image captured by a second image sensor depicting a second candidate region of damage, wherein the overlap threshold is dynamically adjusted for accounting for shadow and/or reflection inconsistencies for reducing probability of misidentifying redundant damage regions.

14. The computer implemented method of claim 1, wherein identifying redundancy comprises:

analyzing each image depicting a candidate region of damage to identify a 3-point correlation comprising: time associated with the image, a pose of an image sensor capturing the image, and alignment of the image; and designating the image depicting the candidate region of damage as unique when the 3-point correlation associated with the image is non-correlated with another 3-point correlation of another image depicting the candidate region of damage.

15. The computer implemented method of claim 14, further comprising designating the image depicting the candidate region of damage as redundant when the 3-point correlation associated with the image is correlated with another 3-point correlation of another image depicting the candidate region of damage.

16. A system for image processing for detection of damage to a vehicle, comprising:
at least one processor executing a code for:
   accessing a plurality of time-spaced image sequences depicting a region of a vehicle, captured by a plurality of image sensors positioned at a plurality of different heights and/or angles relative to the vehicle;
   identifying a plurality of candidate regions of damage in the plurality of time-spaced image sequences;
   performing multi-level redundancy validation by:
      executing spatial correlation between images captured by different images sensors at different heights and/or different angles,
      executing temporal correlation between consecutive images captured by each image sensor, and
      validating persistence of each candidate region of damage across a threshold number of consecutive frames;
   identifying redundancy in the plurality of candidate regions of damage corresponding to a common physical location of the vehicle denoting a single physical damage region based on the multi-level redundancy validation; and
   providing an indication of the common physical location of the vehicle corresponding to the single physical damage region.

17. A non-transitory medium storing program instructions for image processing for detection of damage to a vehicle, which when executed by at least one processor, cause the at least one processor to:
access a plurality of time-spaced image sequences depicting a region of a vehicle, captured by a plurality of image sensors positioned at a plurality of different heights and/or angles relative to the vehicle;
identify a plurality of candidate regions of damage in the plurality of time-spaced image sequences;
perform multi-level redundancy validation by:
   executing spatial correlation between images captured by different images sensors at different heights and/or different angles,
   executing temporal correlation between consecutive images captured by each image sensor, and
   validating persistence of each candidate region of damage across a threshold number of consecutive frames;
identify redundancy in the plurality of candidate regions of damage corresponding to a common physical location of the vehicle denoting a single physical damage region based on the multi-level redundancy validation; and
provide an indication of the common physical location of the vehicle corresponding to the single physical damage region.

* * * * *